(12) United States Patent
Kim et al.

(10) Patent No.: US 9,946,393 B2
(45) Date of Patent: Apr. 17, 2018

(54) METHOD OF CONTROLLING DISPLAY OF ELECTRONIC DEVICE AND ELECTRONIC DEVICE

(71) Applicant: Samsung Electronics Co., Ltd., Gyeonggi-do (KR)

(72) Inventors: Jae-Birm Kim, Gyeonggi-do (KR); Chi-Hyun Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/835,157

(22) Filed: Aug. 25, 2015

(65) Prior Publication Data

US 2016/0055680 A1 Feb. 25, 2016

(30) Foreign Application Priority Data

Aug. 25, 2014 (KR) ........................ 10-2014-0110657

(51) Int. Cl.
*G09G 5/02* (2006.01)
*G06F 3/041* (2006.01)
*G06F 3/01* (2006.01)
*G02B 27/01* (2006.01)
*G06F 3/0481* (2013.01)

(52) U.S. Cl.
CPC ......... *G06F 3/0416* (2013.01); *G02B 27/017* (2013.01); *G06F 3/012* (2013.01); *G06F 3/013* (2013.01); *G06F 3/017* (2013.01); *G02B 2027/014* (2013.01); *G02B 2027/0138* (2013.01); *G02B 2027/0187* (2013.01); *G06F 3/04815* (2013.01)

(58) Field of Classification Search
CPC .................................................. G06F 3/0346

USPC .......................................................... 345/633
See application file for complete search history.

(56) References Cited

U.S. PATENT DOCUMENTS

| | | | | |
|---|---|---|---|---|
| 7,610,558 | B2* | 10/2009 | Morita | G06F 3/011 463/32 |
| 7,773,098 | B2* | 8/2010 | Okuno | G06F 3/012 345/156 |
| 9,158,115 | B1* | 10/2015 | Worley | G02B 27/0172 |
| 2001/0001303 | A1* | 5/2001 | Ohsuga | A63B 24/00 482/5 |
| 2002/0037768 | A1* | 3/2002 | Ohshima | G06F 3/017 463/30 |
| 2002/0084974 | A1* | 7/2002 | Ohshima | A63F 13/00 345/156 |
| 2002/0133264 | A1* | 9/2002 | Maiteh | G05B 19/4097 700/182 |

(Continued)

FOREIGN PATENT DOCUMENTS

JP 3326820 9/2002

*Primary Examiner* — Javid A Amini
(74) *Attorney, Agent, or Firm* — The Farrell Law Firm, P.C.

(57) ABSTRACT

A method of controlling a display of an electronic device and the electronic device thereof are provided. The method includes measuring an amount of movement of a user, when the movement of the user is detected while a Virtual Reality (VR) operation is provided to the user; comparing the amount of the movement with a threshold value corresponding to a type of content being used by the user; and changing the VR operation into a see-through operation, when the amount of the movement is greater than the threshold value corresponding to the type of the content.

12 Claims, 14 Drawing Sheets

(56) References Cited

U.S. PATENT DOCUMENTS

| | | | |
|---|---|---|---|
| 2004/0104935 A1* | 6/2004 | Williamson | G06F 3/012 715/757 |
| 2006/0281996 A1 | 12/2006 | Kuo et al. | |
| 2007/0184422 A1 | 8/2007 | Takahashi | |
| 2007/0248261 A1* | 10/2007 | Zhou | G06F 19/321 382/154 |
| 2008/0030499 A1* | 2/2008 | Wanda | G06F 3/011 345/419 |
| 2009/0106671 A1* | 4/2009 | Olson | G06F 17/30041 715/757 |
| 2010/0277471 A1* | 11/2010 | Beato | G06K 9/4652 345/419 |
| 2012/0054355 A1* | 3/2012 | Arrasvuori | G06Q 10/10 709/229 |
| 2012/0139731 A1* | 6/2012 | Razoumov | A61B 5/0022 340/573.1 |
| 2012/0142415 A1* | 6/2012 | Lindsay | H04N 5/2224 463/33 |
| 2013/0032634 A1* | 2/2013 | McKirdy | G06Q 30/0271 235/375 |
| 2013/0042296 A1* | 2/2013 | Hastings | G06F 21/10 726/1 |
| 2013/0083062 A1* | 4/2013 | Geisner | G02B 27/017 345/633 |
| 2013/0278631 A1* | 10/2013 | Border | G02B 27/017 345/633 |
| 2013/0305437 A1* | 11/2013 | Weller | A42B 3/0406 2/422 |
| 2013/0335301 A1 | 12/2013 | Wong et al. | |
| 2013/0335303 A1* | 12/2013 | Maciocci | G02B 27/017 345/8 |
| 2014/0201666 A1* | 7/2014 | Bedikian | G06F 3/017 715/771 |
| 2014/0201690 A1* | 7/2014 | Holz | G06F 3/017 715/863 |
| 2014/0306875 A1* | 10/2014 | He | G06F 3/017 345/156 |
| 2014/0306891 A1* | 10/2014 | Latta | G06F 3/017 345/158 |
| 2014/0320389 A1* | 10/2014 | Scavezze | G06F 3/011 345/156 |
| 2014/0375680 A1* | 12/2014 | Ackerman | G06T 19/006 345/633 |
| 2015/0212576 A1* | 7/2015 | Ambrus | G06F 3/013 345/156 |
| 2015/0243079 A1* | 8/2015 | Cho | G02B 27/017 345/633 |
| 2015/0279113 A1* | 10/2015 | Knorr | G06T 19/006 345/633 |
| 2015/0317838 A1* | 11/2015 | Foxlin | G02B 27/06 345/633 |
| 2016/0025981 A1* | 1/2016 | Burns | G02B 27/0093 345/156 |
| 2016/0214011 A1* | 7/2016 | Weising | G09G 5/08 |
| 2016/0282938 A1* | 9/2016 | Sako | H04N 13/044 |

* cited by examiner

METHOD OF CONTROLLING DISPLAY OF ELECTRONIC DEVICE AND ELECTRONIC DEVICE

PRIORITY

This application claims priority under 35 U.S.C. § 119(a) to Korean Application Serial No. 10-2014-0110657, which was filed in the Korean Intellectual Property Office on Aug. 25, 2014, the entire content of which is incorporated herein by reference.

BACKGROUND

1. Field of the Invention

The present invention generally relates to a method of controlling a display of an electronic device and an electronic device thereof.

2. Description of the Related Art

Electronic devices which can be worn on a body are generally referred to as a wearable device. An example of electronic devices which can be worn on a body is a head mounted electronic device such as a Head Mounted Display (HMD). The head mounted electronic device may be largely classified into a see-through type for providing the Augmented Reality (AR) and a see-closed type for providing the Virtual Reality (VR).

The see-through type may augment and provide additional information, which is difficult to obtain in the real world, by synthesizing and combining a virtual target or a virtual object on the basis of the real world using characteristics of a semi-permeable lens. The see-closed type, which is an electronic device in which two displays are disposed in front of eyes, may provide an excellent immersion feeling since a user only views content (a game, a movie, a streaming, a broadcasting, etc.) provided on these two displays.

Since the visual field of a user is limited while the user wears a head mounted electronic device having a see-closed type and experiences the VR, it is difficult for the user to recognize and respond to an external element that can put the user in a dangerous situation. For example, as a user wearing the head mounted electronic device moves, he may bump against another object such as surrounding humans or surrounding objects, or may bump against an object coming close to the user.

SUMMARY

The present invention has been made to solve at least the above-mentioned problems and/or disadvantages and to provide at least the advantages described below.

Accordingly, an aspect of the present invention is to provide a method of controlling a display of an electronic device and an electronic device thereof, which can recognize an external element that may cause a dangerous situation in advance, adaptively according to a type of content which a user wearing a head mounted electronic device of a see-closed type is using when the user moves.

Another aspect of the present invention is to provide a method of controlling a display of an electronic device and an electronic device thereof, which can enable a user wearing a head mounted electronic device of a see-closed type to recognize approaching of an object and a direction in which the object approaches when the object approaches the user.

In accordance with an aspect of the present invention, a method of controlling a display of an electronic device, according to various embodiments of the present invention, includes measuring an amount of movement of a user, when the movement of the user is detected while a VR operation is provided to the user; comparing the amount of the movement with a threshold value corresponding to a type of content being used by the user; and changing the VR operation into a see-through operation, when the amount of the movement is greater than the threshold value corresponding to the type of content.

In accordance with another aspect of the present invention, a method of controlling a display of an electronic device according to various embodiments of the present invention includes changing a VR operation into a see-through operation, when it is detected that an object approaches a user, while the VR operation is provided to the user; measuring a direction in which the object approaches; and guiding the direction in which the object approaches.

In accordance with another aspect of the present invention, an electronic device according to various embodiments of the present invention includes a display configured to display a screen according to one of a VR operation and a see-through operation; and a controller configured to, when movement of a user wearing a head mounted electronic device, to which the electronic device is detachably mounted, is detected while the VR operation is provided to the user through the display, measure an amount of movement, and when the amount of movement is greater than a threshold value corresponding to a type of content being used by the user, change the VR operation into the see-through operation.

In accordance with another aspect of the present invention, an electronic device according to various embodiments of the present invention includes a display configured to display a screen according to one of a VR operation and a see-through operation; and a controller configured to, when it is detected that an object approaches a user wearing a head mounted electronic device, to which the electronic device is detachably mounted, while the VR operation is provided to the user through the display, change the VR operation into the see-through operation, and measure and guide a direction in which the object approaches.

In accordance with another aspect of the present invention, a head mounted electronic device according to various embodiments of the present invention includes a movement sensor configured to detect movement of a user wearing the head mounted electronic device; a display configured to display a screen according to one of a VR operation and a see-through operation; and a controller configured to, when movement of the user is detected while the VR operation is provided through the display, measure an amount of movement, and when the amount of movement is greater than a threshold value corresponding to a type of content being used by the user, change the VR operation into the see-through operation.

In accordance with another aspect of the present invention, a head mounted electronic device according to various embodiments of the present invention includes an approaching sensor configured to detect whether an object approaches a user wearing the head mounted electronic device; a display configured to display a screen according to one of a VR operation and a see-through operation; and a controller configured to, when it is detected that the object approaches the user while the VR operation is provided through the display, change the VR operation into the see-through operation, and measure and guide a direction in which the object approaches.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
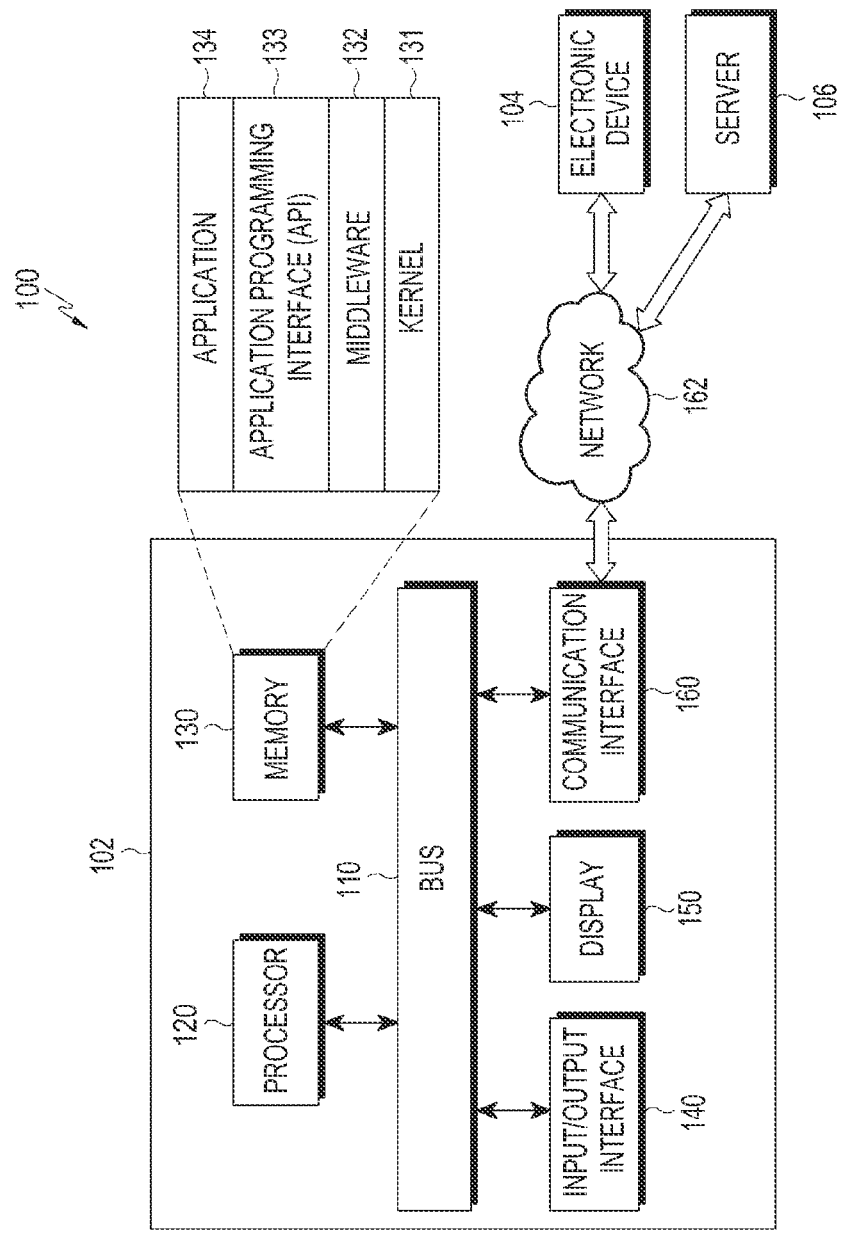
FIG. 1 is a block diagram illustrating a network environment including an electronic device according to an embodiment of the present invention.

Hereinafter, various embodiments of the present invention will be described with reference to the accompanying drawings. The present invention may be modified in various forms and include various embodiments, but specific examples are illustrated in the drawings and described in the description. However, the description is not intended to limit the present invention to the specific embodiments, and it shall be appreciated that all the changes, equivalents and substitutions belonging to the idea and technical scope of the present invention are included in the present invention. In the description of the drawings, identical or similar reference numerals may be used to designate identical or similar elements.

The terms "include" or "may include" refer to the existence of a corresponding disclosed function, operation or element which may be used in various embodiments of the present invention and does not limit one or more additional functions, operations, or elements. Further, as used in embodiments of the present invention, the terms "include", "have", and their conjugates may be construed to denote a certain characteristic, number, step, operation, element, component, or a combination thereof, but may not be construed to exclude the existence of or a possibility of addition of one or more other characteristics, numbers, steps, operations, elements, components, or combinations thereof.

The term "or" used in various embodiments of the present invention includes any or all of combinations of listed words. For example, the expression "A or B" may include A, may include B, or may include both A and B.

The terms such as "first", "second", or the like used in various embodiments of the present invention may modify various elements in the various embodiments but may not limit corresponding elements. For example, the above expressions do not limit the sequence and/or importance of the corresponding elements. The expressions may be used to distinguish an element from another element. For example, a first user device and a second user device indicate different user devices although both of them are user devices. For example, without departing from the scope of the present invention, a first element may be referred to as a second element. Similarly, the second element also may be referred to as the first element.

It should be noted that if it is described that one element is "coupled" or "connected" to another element, the first element may be directly coupled or connected to the second element, and a third element may be "coupled" or "connected" between the first and second elements. Conversely, when one element is "directly coupled" or "directly connected" to another element, it may be construed that a third element does not exist between the first element and the second element.

In the present disclosure, the terms are used to describe a specific embodiment, and are not intended to limit the present invention. As used herein, the singular forms are intended to include the plural forms as well, unless the context clearly indicates otherwise.

Unless defined differently, all terms used herein, which include technical terminologies or scientific terminologies, have the same meaning as would be understood by a person skilled in the art to which the present invention belongs. Such terms as those defined in a generally used dictionary are to be interpreted to have meanings equal to the contextual meanings in the relevant field of art, and are not to be interpreted to have ideal or excessively formal meanings unless clearly defined in the present invention.

An electronic device according to various embodiments of the present invention, for example, may be a first electronic device or a second electronic device that will be mentioned below in the description of various embodiments of the present invention.

For example, the electronic device according to various embodiments of the present invention may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an moving picture experts group 1 (MPEG-1) audio layer-3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to embodiments of the present invention, the electronic device may be a smart home appliance. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to various embodiments of the present invention, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to various embodiments of the present invention, the electronic devices may include at least one of furniture or a part of a building/structure having a communication function, electronic boards, electronic signature receiving devices, projectors, or various measuring equipment (e.g., equipment for a water supply, an electricity, gases or radio waves).

An electronic device according to various embodiments of the present invention may be a combination of one or more of above described various devices. An electronic device according to various embodiments of the present invention may be a flexible device. An electronic device according to various embodiments of the present invention is not limited to the above described devices.

The term "user" used in the description relating to various embodiments of the present invention may refer to a person who uses an electronic device or a device (e.g., an artificial intelligence electronic device) which uses an electronic device. Hereinafter, the term "wearer" used in the description relating to various embodiments of the present invention may refer to a person who wears a head mounted electronic device on a head thereof and uses content provided by the head mounted electronic device or by an electronic device detachably mounted to the head mounted electronic device.

The term "module" used in various embodiments of the present invention may refer to, for example, a unit including one of hardware, software, and firmware, or a combination of two or more of the hardware, software, and firmware. The term "module" may be interchangeable with another term, such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to various embodiments of the present invention may include at least one of an Application-Specific Integrated Circuit (ASIC) chip, a Field-Programmable Gate Arrays (FPGAs), and a programmable-logic device for performing operations which have been known or are to be developed hereafter.

In accordance with various embodiments of the present invention, an electronic device changes a current operation into a see-through operation adaptively according to a type of content which a wearer of a head mounted electronic device of a see-closed type is using, when the wearer moves while a VR operation is performed, so that the wearer can effectively recognize and avoid an external element that may cause a dangerous situation in advance.

In accordance with various embodiments of the present invention, an electronic device changes a current operation into a see-through operation and guides a direction in which an object approaches when the object approaches a wearer of a head mounted electronic device of a see-closed type while the VR operation is performed, so that the wearer can effectively recognize and avoid an external element that may cause a dangerous situation in advance.

FIG. 1 is a block diagram illustrating a network environment 100 including an electronic device 102 according to an embodiment of the present invention.

Referring to FIG. 1, the electronic device 102 may be connected to an external electronic device (e.g., an electronic device 104 or a server 106) through a network 162. According to an embodiment of the present invention, the electronic device 102 may be connected to an external electronic device 104 or 106 not through a network 162.

In the following description relating to an embodiment of the present invention, the electronic device 104 is a head mounted electronic device to which the electronic device is detachably mounted, and the electronic device 102 provides at least one of a VR operation and a see-through operation to a wearer of a head mounted electronic device while being detachably mounted to the electronic device 104. In the following description relating to an embodiment of the present invention, the electronic device 102 refers to a first electronic device, and the electronic device 104 refers to a second electronic device.

In the following description relating to another embodiment of the present invention, the electronic device 104, which is a head mounted electronic device, is used independently with the electronic device 102, and provides at least one of a VR operation and a see-through operation to a wearer of the electronic device 104. The electronic device 102 may include a bus 110, a processor 120, a memory 130, an input/output interface 140, a display 150 and a communication interface 160.

The bus 110 is a circuit for connecting elements of the electronic device 102 to each other and transferring communication information (e.g., a control message) between the elements.

The processor 120, for example, receives a command from other components (e.g., the memory 130, the input/output interface 140, the display 150, the communication interface 160, and the like) through the bus 110, decodes the received command, and executes calculation or data processing according to the decoded command.

The memory 130 stores commands or data received from the processor 120 or other components (e.g., the input/output interface 140, the display 150, the communication interface 160, and the like) or generated by the processor 120 or the other elements. The memory 130 may include programming modules, e.g., a kernel 131, a middleware 132, an Application Programming Interface (API) 133, or an application 134. Each of the programming modules may be formed of software, firmware, hardware, or a combination of two or more thereof.

The kernel 131 controls or manages system resources (e.g., the bus 110, the processor 120, the memory 130, etc.) used for executing an operation or a function implemented in other programming modules, e.g., the middleware 132, the API 133, or the application 134. Further, the kernel 131 provides an interface that enables the middleware 132, the API 133, or the application 134 to access an individual element of the electronic device 102 to perform a control or management.

The middleware 132 performs intermediation such that the API 133 or the application 134 may receive/transmit data while communicating with the kernel 131. Further, in association with operation requests received from the application 134, the middleware 132 executes a control for an operation request (e.g., scheduling or load balancing) by using, for example, a method of assigning, to at least one of application 134, a priority of use of a system resource of the electronic device 102 (e.g., the bus 110, the processor 120, the memory 130, etc.).

The API 133, which is an interface used by the application 134 to control a function provided from the kernel 131 or the middleware 132, may include, for example, at least one interface or function (e.g. a command) for a file control, a window control, image processing, a character control, etc.

In accordance with an embodiment of the present invention, the application 134 may include a Short Message Service (SMS)/Multimedia Messaging Service (MMS) application, an email application, a calendar application, an alarm application, a health care application (e.g., an application for measuring a quantity of exercise, blood sugar, etc.), an environment information application (e.g., an application for providing information on atmospheric pressure, humidity, temperature, etc.), etc. Alternatively, the application 134 may be an application relating to the exchange of information between the electronic device 102 and an external electronic device 104. The application relating to the exchange of information may include, for example, a notification relay application for transferring specific information to an external electronic device or a device management application for managing an external electronic device.

For example, the notification relay application may include a function of transferring, to the external electronic device 104, notification information generated by other applications of the electronic device 102 (e.g. an SMS/MMS application, an e-mail application, a health management application, an environmental information application, etc.). Alternatively, the notification relay application may, for example, receive notification information from an external electronic 104 to provide the notification information to a user. The device management application may manage (e.g., install, delete, or update), for example, a function of at least a part of an external electronic device communicating with the electronic device 102 (e.g., activating/deactivating of the electronic device 104 (or a partial component thereof) or adjusting of luminance (or resolution) of a display), an application operated in the external electronic device, or a service provided from the external electronic device (e.g., a voice call service or a message service).

In accordance with an embodiment of the present invention, the application 134 may include an application specified according to attributes (e.g., a type of the electronic device) of an external electronic device 104. For example, when the external electronic device is an MP3 player, the application 134 may include an application relating to the reproduction of music. Similarly, when the external electronic device is a mobile medical device, the application 134 may include an application relating to health care.

In accordance with an embodiment of the present invention, the application 134 may include at least one of an application specified to the electronic device 102 and an application received from an external electronic device (e.g. the server 106 or the electronic device 104).

In accordance with an embodiment of the present invention, the application 134 may include an application which provides a VR operation or a see-through operation by communicating with the electronic device 104 when the electronic device 102 is used while being mounted to the electronic device 104.

The input/output interface 140 transfers a command or data input by a user through an input/output device (e.g., a sensor, a keyboard, or a touch screen) to the processor 120, the memory 130 and the communication interface 160 for example, through the bus 110. For example, the input/output interface 140 may provide, to the processor 120, data for a touch of a user input through a touch screen. The input/output interface 140 outputs, for example, a command or data received through the bus 110 from the processor 120, the memory 130 and the communication interface 160, to an input/output device (e.g., a speaker or display).

The display 150 displays various types of information (e.g., multimedia data, text data, etc.) to a user. The display 150 displays a screen according to the VR operation or the see-through operation according to an embodiment of the present invention.

The communication interface 160 connects communication between the electronic device 102 and an external electronic device 104 or 106. For example, the communication interface 160 may communicate with an external electronic device while being connected to the network 162 through wireless communication or wired communication. In an embodiment of the present invention, the communication interface 160 connects wireless communication or wired communication between the electronic device 102 and an electronic device 104 or 106 not through the network 162. The wireless communication may include at least one of, for example, Wireless Fidelity (Wi-Fi), Bluetooth (BT), Near Field Communication (NFC), a Global Positioning System (GPS), and a cellular communication (e.g., Long Term Evolution (LTE), Long Term Evolution-Advance (LTE-A), Code Division Multiple Access (CDMA), Wideband Code Division Multiple Access (WCDMA), Universal Mobile Telecommunication System (UMTS), Wireless Broadband (WiBro), a Global System for Mobile communication (GSM), etc.). The wired communication may include at least one of, for example, a Universal Serial Bus (USB), a Universal Asynchronous Receiver/Transmitter (UART), a Mobile High-definition Link (MHL), a High Definition Multimedia Interface (HDMI), a Recommended Standard 232 (RS-232), and a Plain Old Telephone Service (POTS).

In accordance with an embodiment of the present invention, the network 162 may be a communication network. The communication network may include at least one of a computer network, Internet, Internet of Things and a telephone network. In accordance with an embodiment of the present invention, a protocol (e.g., a transport layer protocol, a data link layer protocol or a physical layer protocol) for communication between the electronic device 102 and an external electronic device may be supported by at least one of the application 134, the API 133, the middleware 132, the kernel 131 and the communication interface 160.

In accordance with an embodiment, a controller of the electronic device 102 may include the processor 120 and the memory 130 for storing information required by the processor 120. The controller may be a Central Processing Unit (CPU). The controller of the electronic device 102 controls an overall operation of the electronic device 103 and performs an operation according to a method of controlling a display according to an embodiment of the present invention.

In accordance with an embodiment of the present invention, the controller of the electronic device 102 measures the amount of movement of a wearer of the head mounted electronic device when the movement is detected through a movement sensor while the electronic device provides a VR operation through the display 150. An acceleration sensor, a gyro sensor, an earth magnetic field sensor, and the like may be used as the movement sensor. As described below, the movement sensor may be included in the head mounted electronic device. In an embodiment of the present invention, the movement sensor may be included in the electronic device 102 or another electronic device connected to the electronic device 102. The controller of the electronic device 102 may change a VR operation into a see-through operation when the amount of movement is larger than a threshold value corresponding to a type of content, which the wearer is viewing. The see-through operation may be an operation performed by the controller of the electronic device 120 to photograph the front view from the wearer through a camera which may be included in the input/output interface 140 and to display, on the display 150, a preview screen according to the photographing.

In accordance with an embodiment of the present invention, the controller of the electronic device 102 may change a VR operation into a see-through operation when an approaching sensor detects that an object approaches the wearer of the head mounted electronic device while the electronic device 102 provides the VR operation through the display 150. As described below, the approaching sensor may be included in the head mounted electronic device. In an embodiment of the present invention, the approaching sensor may be included in the electronic device 102 or another electronic device connected to the electronic device 102. When changing the VR operation into the see-through operation, the controller of the electronic device 102 measures a direction in which the object approaches through the approaching sensor included in the head mounted electronic device to guide the measured direction for a user. The controller of the electronic device 102 may guide the direction in which the object approaches by displaying, on the display 150, an image indicating the direction in which the object approaches. The image indicating the direction in which the object approaches may be, for example, an arrow.

An electronic device according to an embodiment of the present invention may include a display configured to display a screen according to one of the VR operation and the see-through operation, and a controller configured to, when movement of a user wearing a head mounted electronic device, to which the electronic device is detachably mounted, is detected while the VR operation is provided to the user through the display, measure an amount of the movement, and when the amount of the movement is greater than a threshold value corresponding to a type of content being used by the user, change the VR operation into the see-through operation.

The controller may detect the movement and measure the amount of the movement, through the movement sensor included in the head mounted electronic device.

The electronic device may further include a camera, and the controller, when changing the VR operation into the see-through operation, may photograph the front view from the user through the camera and display a preview screen according to the photographing through the display.

The electronic device according to an embodiment of the present invention may include a display configured to display a screen according to one of the VR operation and the see-through operation, and a controller configured to, when it is detected that an object approaches a user wearing a head mounted electronic device, to which the electronic device is detachably mounted, while the VR operation is provided to the user through the display, change the VR operation into the see-through operation, and measure and guide a direction in which the object approaches.

The controller may detect the approaching of the object and measure the direction in which the object approaches, through an approaching sensor included in the head mounted electronic device.

The electronic device may further include a camera, and the controller, when changing the VR operation into the see-through operation, may photograph the front view from the user through the camera and display a preview screen according to the photographing through the display.

The controller may guide the direction in which the object approaches by displaying an image indicating the direction in which the object approaches through the display.

Figure 2:
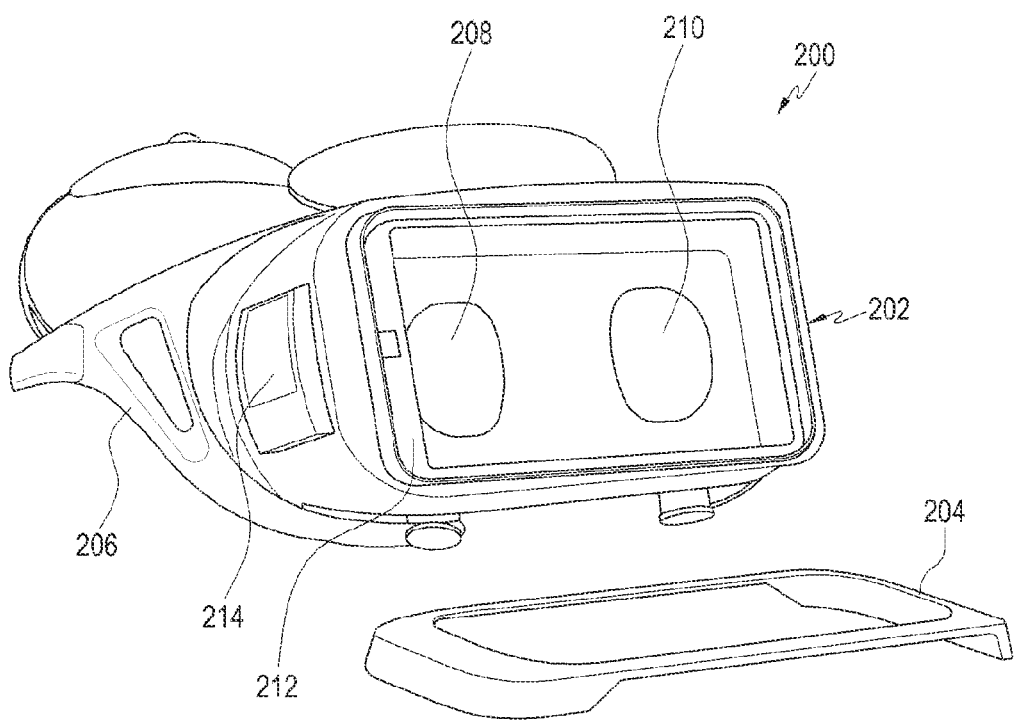
FIG. 2 illustrates an example of a head mounted electronic device according to an embodiment of the present invention.

FIG. 2 illustrates an example of a head mounted electronic device 200 according to an embodiment of the present invention.

Referring to FIG. 2, the head mounted electronic device 200 may be, for example, the electronic device 104 of FIG. 1. The head mounted electronic device 200 includes a body 202 and a cover 204. The body 202 includes a support 206, two lenses 208 and 210, a mounting part 212, and a control device 214.

When the electronic device 102 of FIG. 1 is mounted to the head mounted electronic device 200, the cover 204 covers the rear edge of the electronic device 102 to fix the electronic device 102 to the head mounted electronic device 200 so as to maintain the mounting state of the electronic device 102. The support 206 is a mechanism used for mounting the head mounted electronic device 200 to a head of a user by a user. The lenses 208 and 210 are installed at locations corresponding to both eyes of the wearer, respectively. The wearer can view a screen of the display through the lenses 208 and 210. The mounting part 212 has a mechanical structure by which, for example, the electronic device 102 of FIG. 1 may be detachably mounted to the head mounted electronic device 200.

The control device 214 may be installed at a side surface of the body 202. The control device 214 is used for an input for controlling the head mounted electronic device 200 by the wearer. For example, the control device 214 may include at least one of a touch panel, a button, a wheel key, and a touch pad. The touch panel receives a touch input of a user. The touch input may be an input in which a user directly touches the touch panel or a hovering input in which a user approaches the touch panel. The head mounted electronic device 200 transmits, to the electronic device 102, an input received through the control device 214 while being connected to the electronic device 102 through an interface such as a USB. The electronic device 102 controls a function corresponding to an input received through the control device 214 of the head mounted electronic device 200 in response to the input. For example, the electronic device 102 may adjust a volume or control reproducing an image in response to the received input.

Figure 3A:
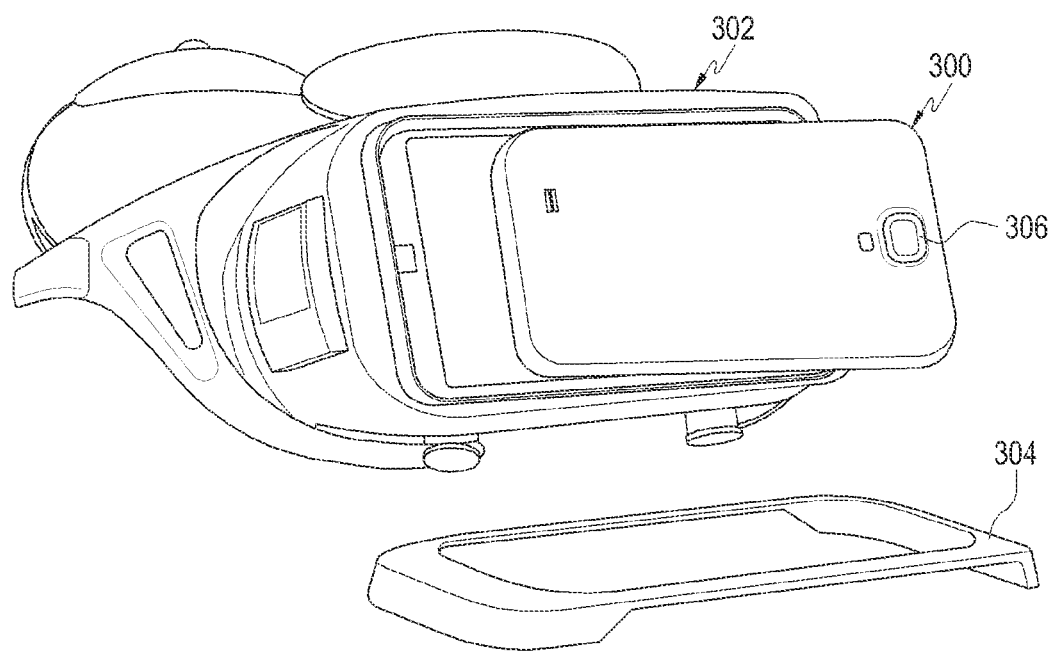
FIG. 3A illustrates an example in which a first electronic device is mounted to a second electronic device according to an embodiment of the present invention.
Figure 3B:
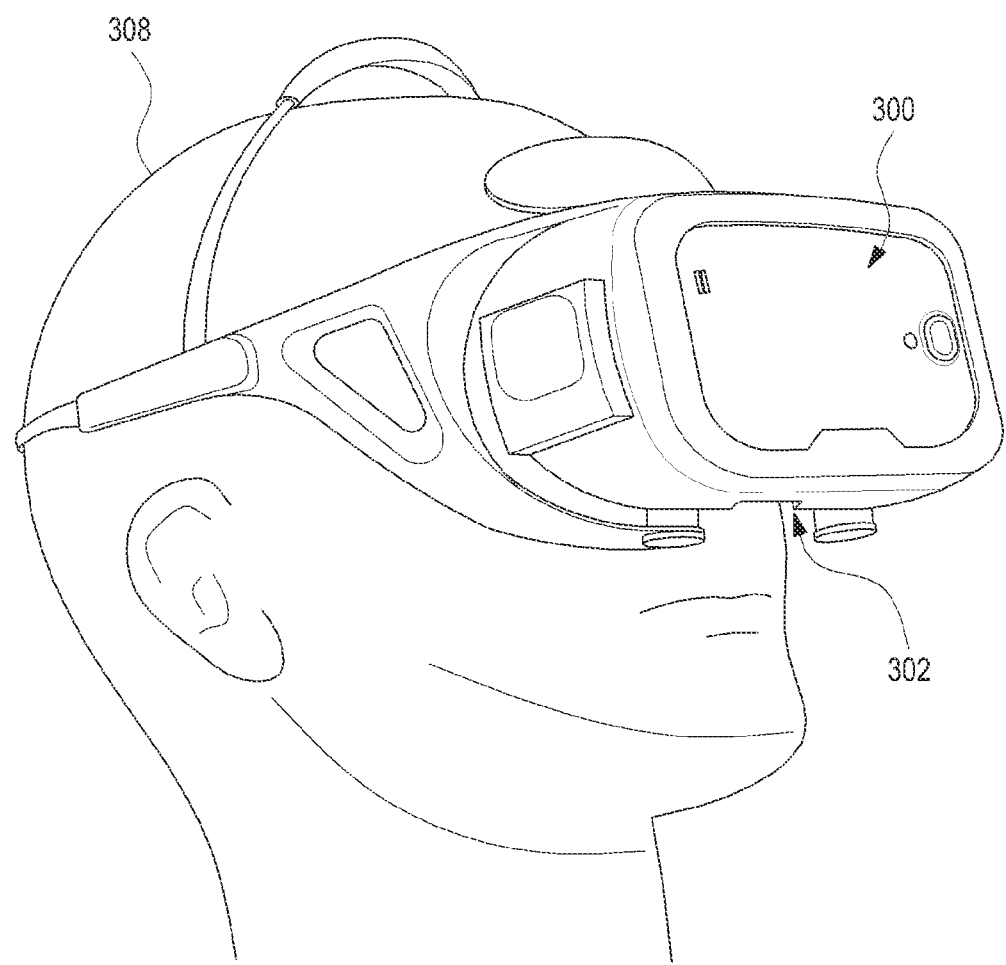
FIG. 3B illustrates an example in which a user wears a second electronic device to which a first electronic device is mounted according to an embodiment of the present invention.

FIG. 3A illustrates an example in which a first electronic device 300 is mounted to a second electronic device 302 according to an embodiment of the present invention. FIG. 3B illustrates an example in which a user wears the second electronic device 302 to which the first electronic device 300 is mounted according to an embodiment of the present invention.

Referring to FIGS. 3A and 3B, the first electronic device 300 may be the electronic device 102 of FIG. 1, and may be, for example, a smartphone including a rear camera 306 installed at the rear surface thereof. The second electronic device 302 may be the electronic device 104 of FIG. 1, and may be the head mounted electronic device 200 of FIG. 2.

As illustrated in FIG. 3A, a user may mount the first electronic device 300 to a mounting part of the second electronic device 302 (e.g., the mounting part 212 of FIG. 2) such that the front surface on which a display of the first electronic device 300 is installed faces lenses (e.g., the lenses 208 and 210 of FIG. 2). The user may cover a cover 304 to fix the first electronic device 300 to the second electronic device 302. The user may wear the second electronic device 302 to which the first electronic device is mounted on a head thereof as in FIG. 3B. FIG. 3B illustrates that a wearer 308 wears the second electronic device 302 to which the first electronic device 300 is mounted on a head thereof. The wearer 308 may view a screen of the display of the first electronic device 300 through the lenses of the second electronic device 302 (e.g., lenses 208 and 210 of FIG. 2).

Figure 4:
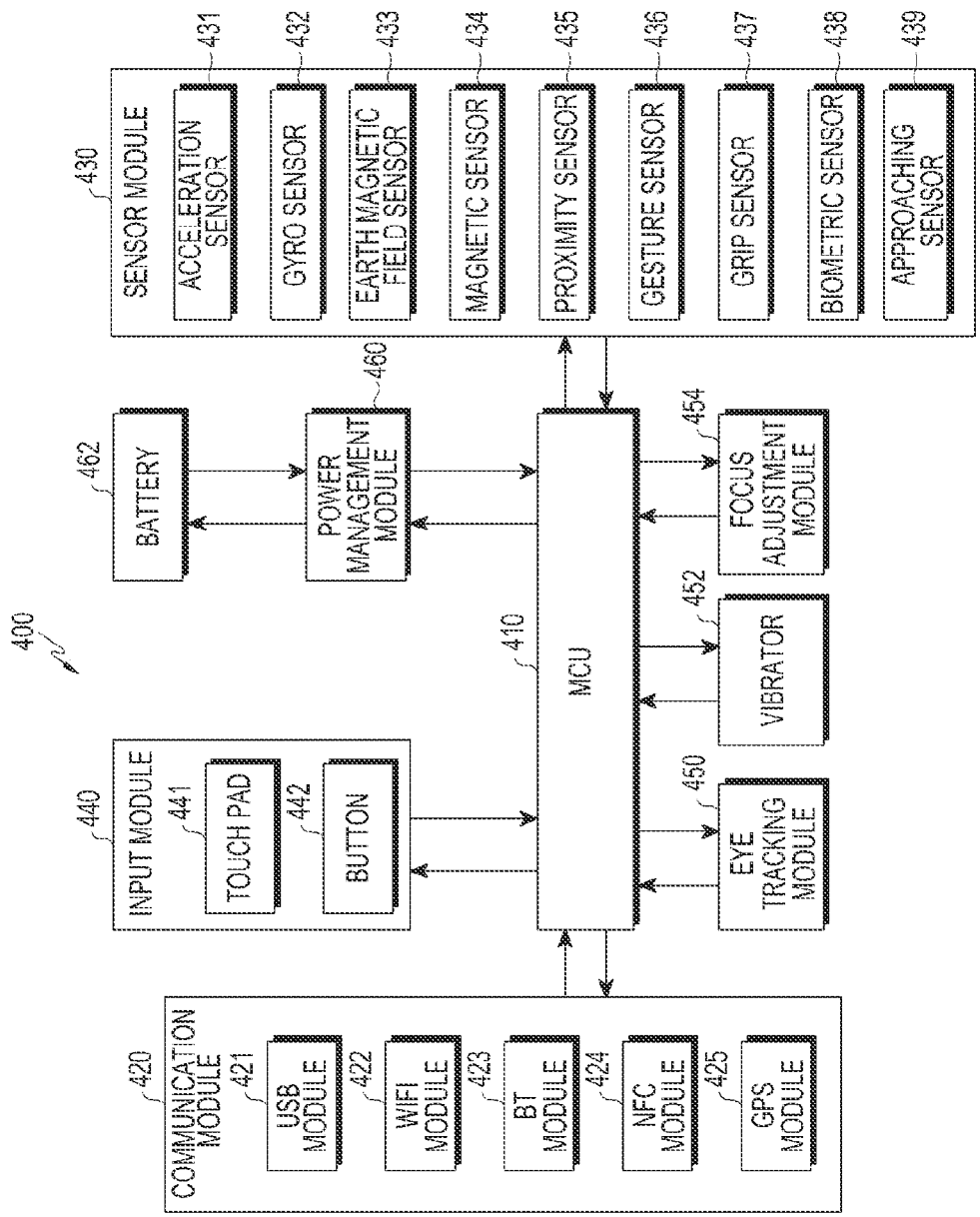
FIG. 4 is a block diagram illustrating a configuration of a second electronic device according to an embodiment of the present invention.

FIG. 4 is a block diagram illustrating a second electronic device 400 according to an embodiment of the present invention;

Referring to FIG. 4, the second electronic device 400 may be the electronic device 104 of FIG. 1, may be the head mounted electronic device 200 of FIG. 2, and may be the second electronic device 302 of FIGS. 3A and 3B. A second electronic device 400 may include a Micro Controller Unit (MCU) 410, a communication module 420, a sensor module 430, an input module 440, an eye tracking module 450, a vibrator 452, a focus adjustment module 454, a power management module 460, and a battery 462.

The MCU 410 is a controller of the second electronic device 400 which may control other elements (e.g., the communication module 420, the sensor module 430, the input module 440, the eye tracking module 450, the vibrator 452, the focus adjustment module 454, and the power management module 460) by driving an Operating System (OS) or an embedded software program. The MCU 410 may include a processor and a memory.

The communication module 420 electrically connects the first electronic device 300 of FIGS. 3A and 3B and the second electronic device 400 using wired communication or wireless communication so as to perform data transmission/ reception. In accordance with an embodiment of the present invention, the communication module 420 may include a USB module 421, a WiFi module 422, a BT module 423, a NFC module 424, and a GPS module 425. In accordance with an embodiment of the present invention, at least two of the USB module 421, the WiFi module 422, the BT module 423, the NFC module 424, and the GPS module 425 may be included in an Integrated Chip (IC) or an IC package.

The sensor module 430 measures a physical quantity or detects an operating state of the second electronic device 400 to change the measured or detected information into an electric signal. The sensor module 420 may include, for example, at least one of an acceleration sensor 431, a gyro sensor 432, an Earth magnetic field sensor 433, a magnetic sensor 434, a proximity sensor 435, a gesture sensor 436, a grip sensor 437, a biometric sensor 438, and an approaching sensor 439. The second electronic device 400 may detect movement of a head of a wearer wearing the second electronic device 400 using at least one of the acceleration sensor 431, the gyro sensor 432, and the Earth magnetic field sensor 433. The second electronic device 400 may detect whether the second electronic device 400 is worn, using the proximity sensor 435 or the grip sensor 437. In accordance with an embodiment, the second electronic device 400 may detect whether a user wears the second electronic device, by detecting at least one of infrared recognition, pressurization recognition, and a change in a capacitance (or a dielectric constant) according to the wearing of the second electronic device 400 by the user. The gesture sensor 436 may receive an input operation of the second electronic device 400 by detecting movement of a hand or a finger of the user. The second electronic device 400 may detect whether an object approaches the wearer of the second electronic device 400, using the approaching sensor 439. Alternatively, the sensor module 430 may include, for example, a biometric sensor such as an E-nose sensor, an Electromyography (EMG) sensor, an Electroencephalogram (EEG) sensor, an Electrocardiogram (ECG) sensor, an iris sensor, and a fingerprint sensor, and may recognize biometric information of the user using the biometric sensor 438. The sensor module 430 may further include a control circuit for controlling one or more sensors included therein.

The input module 440 may be the control device 214 of FIG. 2. The input module 440 may receive an input from a user. The input module 440 may include a touch pad 441 and a button 442. The touch panel 441 recognizes a touch input using at least one scheme of, for example, a capacitive scheme, a resistive scheme, an infrared scheme, and an acoustic wave scheme. The touch pad 441 may further include a control circuit. The capacitive scheme touch panel may recognize physical contact or proximity. The touch panel 441 may further include a tactile layer. In this case, the touch panel 440 may provide a user with a tactile reaction. The button 442 may include, for example, a physical button, an optical key, or a keypad.

The power management module 460 manages electric power of the second electronic device 400. Although not illustrated, the power management module 460 may include, for example, a Power Management Integrated Circuit (PMIC), a charger Integrated Circuit (IC), or a battery gauge.

The PMIC may be mounted to, for example, an IC or a SoC semiconductor. Charging methods may be classified into a wired charging method and a wireless charging method. The charging IC charges a battery and prevents introduction of over-voltage or over-current from a charger. In accordance with an embodiment of the present invention, the charging IC may include a charging IC for at least one of the wired charging method and the wireless charging method. A magnetic resonance scheme, a magnetic induction scheme, or an electromagnetic scheme may be examples of the wireless charging method, and an additional circuit for wireless charging, such as a coil loop circuit, a resonance circuit, a rectifier circuit, and the like may be added.

The battery gauge measures, for example, a residual quantity of the battery 462, and a voltage, a current, or a temperature during the charging. The battery 462 stores electricity and supply power. The battery 462 may include, for example, a rechargeable battery or a solar battery.

The eye tracking module 450 tracks an eye of a user using at least one scheme of, for example, an Electrical Oculography (EOG) sensor, a coil system, a dual purkinje system, a bright pupil system, and a dark pupil system. Further, the eye tracking module 450 may further include a micro camera for tracking an eye.

The focus adjustment module 454 measures an Inter-Pupil Distance (IPD) of a user to enable the user to view an image suitable for eyesight of the user. The second electronic device 400 may adjust a distance of lens according to the IPD of the user measured through the focus adjustment module 454. The second electronic device 400 may adjust a display location of a screen through the display of the first electronic device 300 by transmitting the IPD of the user measured by the focus adjustment module 454 to the first electronic device 300.

The MCU 410 transmits, to the first electronic device 300, a movement signal detected by the movement sensor of the sensor module 430. The movement sensor may be at least one of the acceleration sensor 431, the gyro sensor 432, and the Earth magnetic field sensor 433.

The MCU 410 detects, through the approaching sensor 439, whether an object approaches the wearer of the second electronic device 400 to transmit an approaching detection signal to the first electronic device 300. The MCU 410 detects, through the approaching sensor 439, a direction in which an object approaches the wearer of the second electronic device 400, to transmit the direction to the first electronic device 300.

A space recognition sensor such as an Infrared (IR) sensor, an ultrasonic sensor, a Radio Frequency (RF) sensor and radar may be employed as the approaching sensor 439. A Wisee sensor, an Allsee sensor, and the like may be employed as the RF sensor. In an embodiment of the present invention, a wireless communication module may be employed as the approaching sensor 439. The wireless communication module may be at least one of the WiFi module 422, the BT module 423, the NFC module 424 and the GPS module 425. When an object approaches the second electronic device 400, reception electric field strength of a wireless communication signal received by the wireless communication module may be weakened due to the approaching object. When the wearer of the second electronic device 400 does not move, if the reception electric field strength is rapidly reduced by a value larger than a specified threshold value, the MCU 410 detects that an object approaches the second electronic device 400. Further, the MCU 410 detects that a direction in which the reception electric field strength is rapidly reduced by a value larger than the specified threshold value is a direction in which an object approaches.

Figure 5:
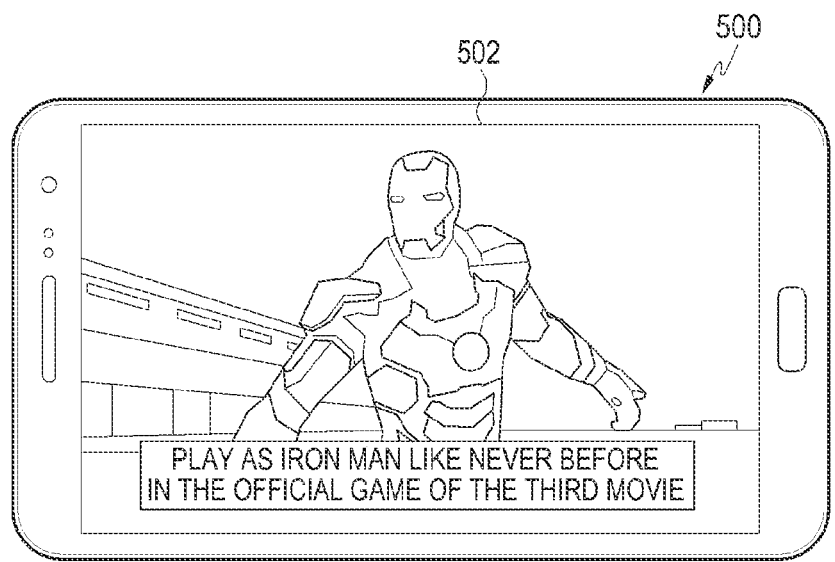
FIG. 5 illustrates an example of a normal operation screen according to an embodiment of the present invention.

FIG. 5 illustrates an example of a normal operation screen 502 according to an embodiment of the present invention.

Referring to FIG. 5, an electronic device 500 may be the electronic device 102 of FIG. 1, and may be the first electronic device 300 of FIGS. 3A and 3B. The electronic device 500 displays a normal operation screen 502, when the electronic device 500 does not perform a VR operation or a see-through operation.

Figure 6:
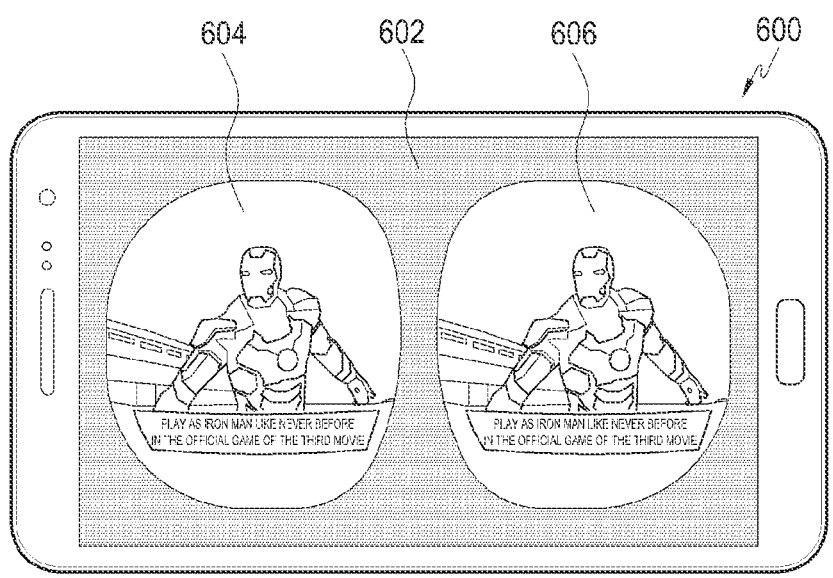
FIG. 6 illustrates an example of a VR operation screen according to an embodiment of the present invention.

FIG. 6 illustrates an example of a VR operation screen 602 according to an embodiment of the present invention.

Referring to FIG. 6, an electronic device 600 may be the electronic device 102 of FIG. 1, and may be the first electronic device 300 of FIGS. 3A and 3B. The electronic device 600 displays the VR operation screen 602 when performing a VR operation while being mounted to the second electronic device 302 of FIGS. 3A and 3B. In the VR operation screen 602, one image is separated displayed as two images 604 and 606. In accordance with an embodiment of the present invention, since an image may be distorted by the lens included in the second electronic device 302 during the VR operation, an image of a plane may be inverse-distorted according to characteristics of the lenses in order to provide a non-distorted image to a user.

Figure 7:
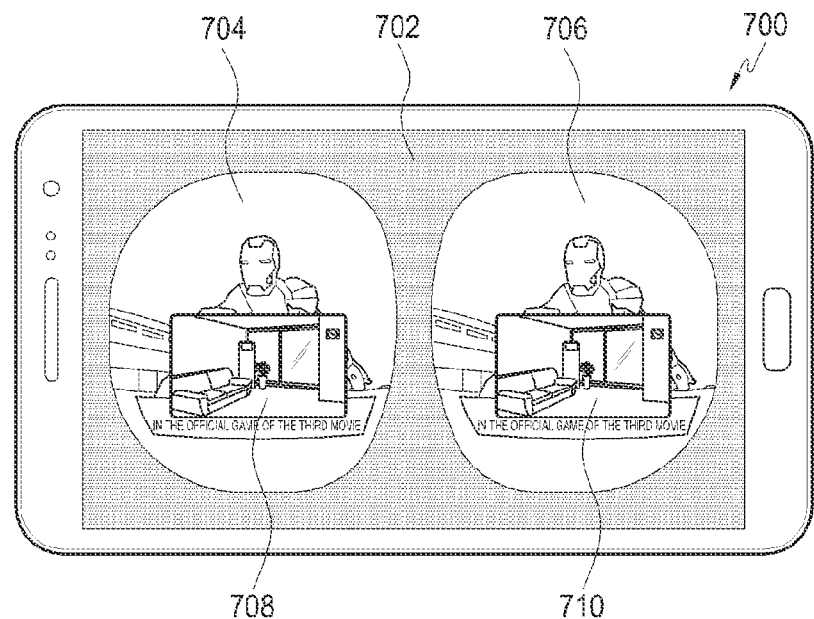
FIG. 7 illustrates an example of a see-through operation screen according to an embodiment of the present invention.

FIG. 7 illustrates an example of a see-through operation screen 702 according to an embodiment of the present invention.

Referring to FIG. 7, an electronic device 700 may be the electronic device 102 of FIG. 1, and may be the first electronic device 300 of FIGS. 3A and 3B. In accordance with an embodiment of the present invention, the electronic device 700 mounted to the second electronic device 302 of FIGS. 3A and 3B may provide a see-through operation using the rear camera 306 of FIG. 3A. In accordance with an embodiment of the present invention, when the wearer of the second electronic device 302 presses a see-through operation change button which may be included in the button 442 of the second electronic device 302 of FIG. 4, the electronic device 700 operates the rear camera 306 thereof. The electronic device 700 provides the see-through operation by displaying preview screens 708 and 710 photographed by the rear camera 306 on partial areas of VR operation screens 704 and 706 in the form of the Picture-In-Picture (PIP) as illustrated in FIG. 7, respectively.

Figure 8:
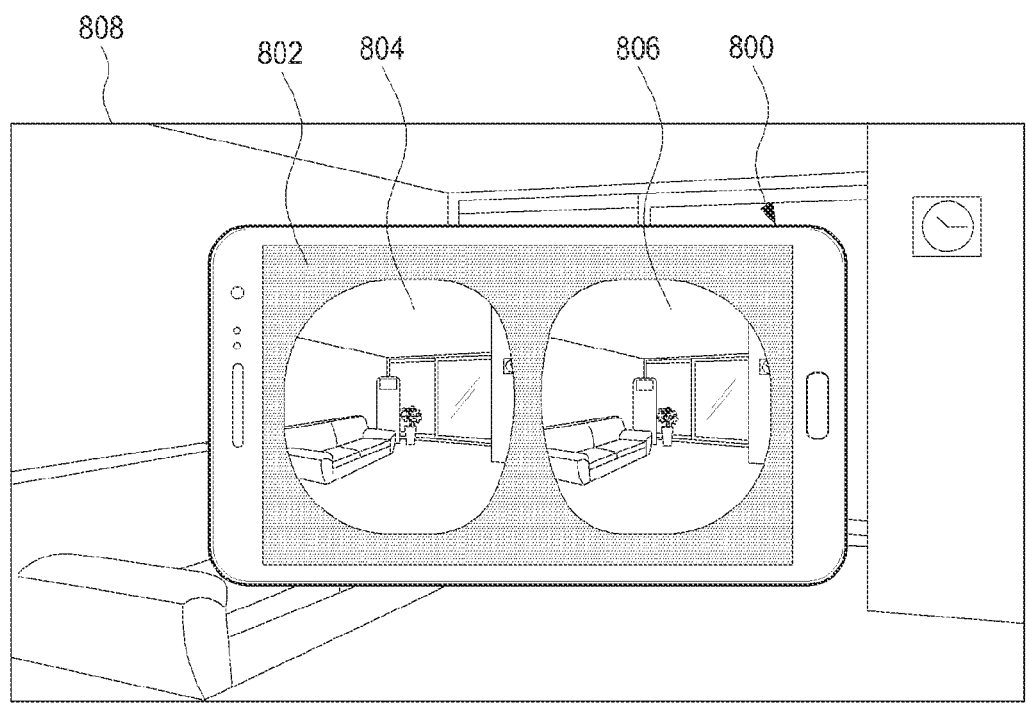
FIG. 8 illustrates another example of a see-through operation screen according to an embodiment of the present invention.

FIG. 8 illustrates another example of a see-through operation screen 802 according to an embodiment of the present invention.

Referring to FIG. 8, an electronic device 800 may be the electronic device 102 of FIG. 1, and may be the first electronic device 300 of FIGS. 3A and 3B. In accordance with an embodiment of the present invention, the electronic device 800 mounted to the second electronic device 302 of FIGS. 3A and 3B may provide a see-through operation using the rear camera 306 of FIG. 3A. The electronic device 800 changes a VR screen into a see-through operation, expands preview screens 804 and 806 photographed by the rear camera 306 to the whole screen, and displays the expanded preview screens 804 and 806 as illustrated in FIG. 8. The preview screens 804 and 806 correspond to examples obtained by photographing, by the rear camera 306, a scene 808 in a front view from the wearer of the second electronic device 302 to which the electronic device 800 is mounted.

Through the see-through operation screen 702 in FIG. 7 or the see-through operation screen 802 in FIG. 8 which is described above, a user can simultaneously experience a VR environment and be showed a surrounding environment by an image obtained through the camera.

Figure 9:
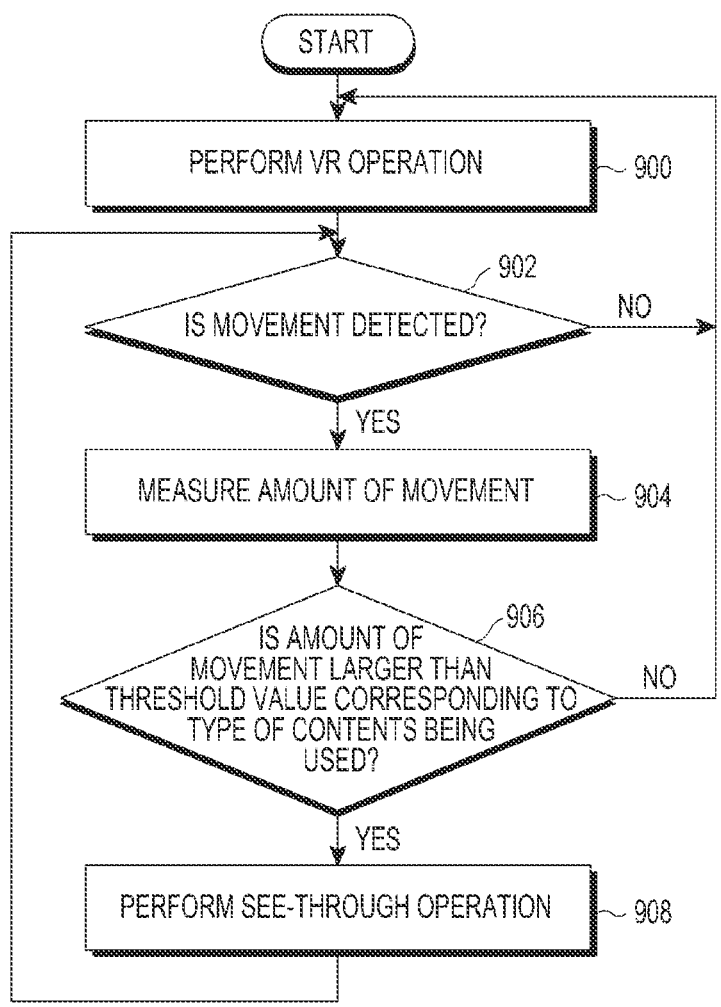
FIG. 9 is a flowchart illustrating an example of a method of controlling a display by a first electronic device according to an embodiment of the present invention.

FIG. 9 is a flowchart illustrating an example of a method of controlling a display by a first electronic device according to various embodiments of the present invention. The first electronic device may be the electronic device 102 of FIG. 1, and may be the first electronic device 300 of FIGS. 3A and 3B.

Referring to FIG. 9, at step 900, the first electronic device mounted to a second electronic device performs a VR operation. The second electronic device may be the electronic device 104 of FIG. 1, may be the head mounted electronic device 200 of FIG. 2, may be the second electronic device 302 of FIGS. 3A and 3B, and may be the second electronic device 400 of FIG. 4.

At step 902, the first electronic device determine whether movement such as head tracking and position moving of the wearer wearing the second electronic device to which the first electronic device is mounted while performing the VR operation is detected. When the movement is not detected at step 902, the first electronic device proceeds to step 900.

At step 904, the first electronic device measures the amount of the movement when the movement of the wearer is detected at step 902. In an embodiment of the present invention, the first electronic device detects the movement and measures the amount of the movement using the movement sensor included in the second electronic device.

At step 906, the first electronic device compares the amount of the movement with a threshold value corresponding to a type of content being used (e.g., viewed) by the wearer. At step 906, when the amount of the movement is not greater than the threshold value corresponding to a type of content being used (e.g., viewed) by the wearer, the first electronic device proceeds to step 900. At step 906, when the amount of the movement is greater than the threshold value corresponding to a type of content being used (e.g., viewed) by the wearer, the first electronic device proceeds to step 908.

At step 908, the first electronic device 300 changes the VR operation into the see-through operation, and then proceeds to step 902. Therefore, when the amount of movement is not greater than the threshold value after the VR operation is changed into the see-through operation, the first electronic device 300 may provide the VR operation again at step 900.

In accordance with an embodiment of the present invention, when the position of the wearer is rapidly changes by an amount greater than a specified value, the first electronic device determines that a current situation is an emergency situation and automatically changes a current operation into a see-through operation.

In accordance with an embodiment of the present invention, a threshold value for the sensitivity of a sensor or the automatic change may be adjusted to one of a plurality of threshold values in order to perform an automatic change function according to movement of the wearer. In accordance with an embodiment of the present invention, a threshold value for the sensitivity of a sensor or the automatic change may be adjusted according to a type of content being used by the wearer. The plurality of threshold values may be specified in accordance with various type of content, respectively.

For example, when the wearer is viewing video content (movie, TV, streaming video, etc.), movement and position moving of a head may be relatively small, compared with a case of content such as a first-person shooting game being used. At this time, a threshold value for changing the VR operation into the see-through operation may be specified to be more sensitive to movement, compared with a case of game content being used. An operation for viewing video content and an operation for viewing the outside using the see-through operation may be classified on the basis of the threshold value specified in this way.

As another example, when the wearer is using content such as a first-person shooting game, movement and position moving of a head may be relatively large, compared with the case of video content being used. At this time, a threshold value for changing the VR operation into the see-through operation may be specified to be less sensitive to movement, compared with a case of video content being viewed. An operation for playing a game and an operation for viewing the outside using the see-through operation may be classified on the basis of the threshold value specified in this way.

Thus, when the first electronic device detects moving a head or standing up and moving while the wearer views content, if the amount of movement is larger than a threshold value according to a type of content being viewed, the first electronic device 300 may determine that the wearer wants to view the outside, and automatically change the VR operation into the see-through operation, so that the wearer can efficiently recognize and avoid an external dangerous situation in advance.

A method of controlling a display of an electronic device according to an embodiment of the present invention includes measuring an amount of movement of a user, when the movement of the user is detected while the VR operation is provided to the user, comparing the amount of the movement with a threshold value corresponding to a type of content being used by the user, and changing the VR operation into a see-through operation, when the amount of the movement is greater than the threshold value corresponding to the type of the content.

A threshold value corresponding to game content may be specified larger than a threshold value corresponding to video content.

Changing the VR operation into a see-through operation may include photographing the front view from the user, and displaying a preview screen according to the photographing.

Figure 10:
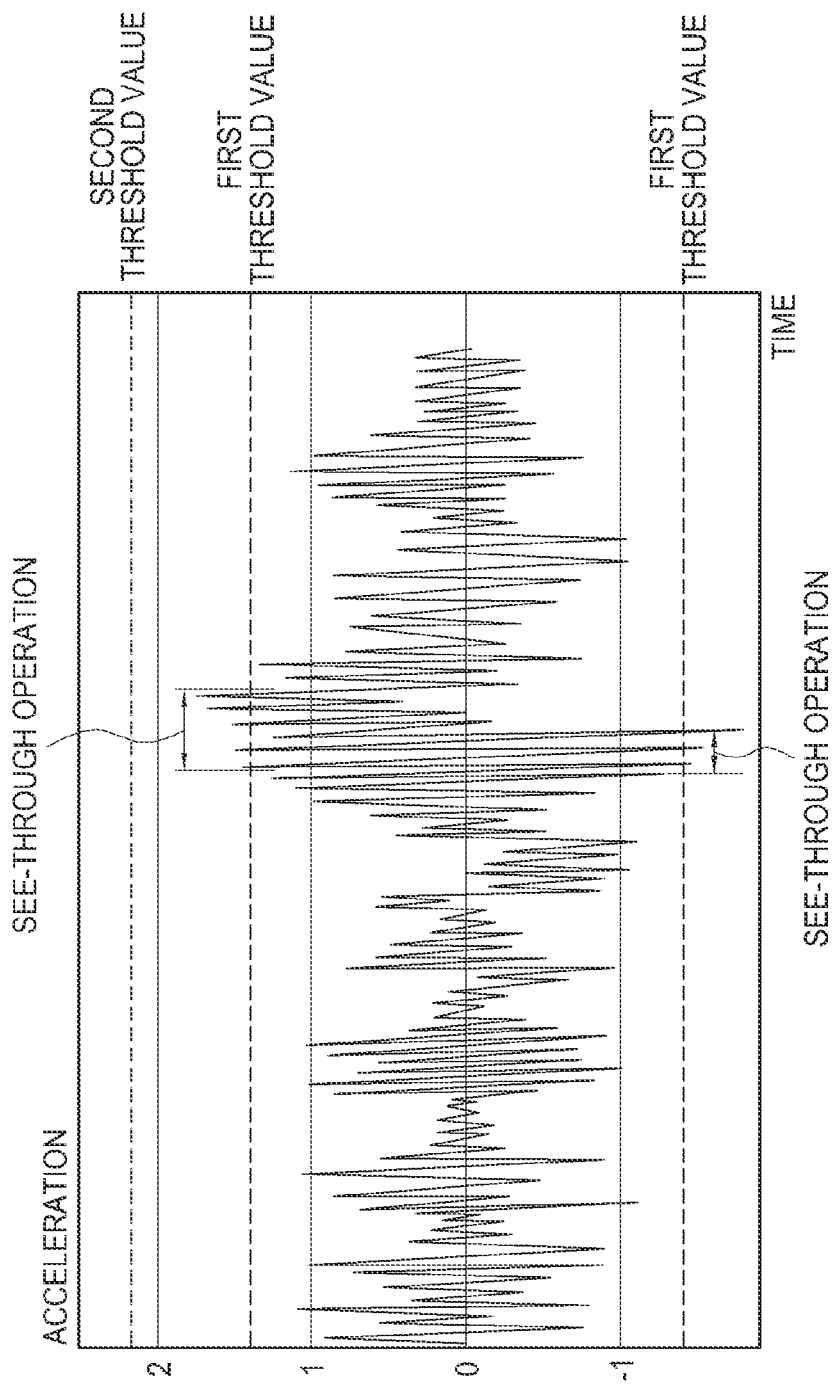
FIG. 10 is a graph depicting a change into a see-through operation according to an acceleration value for a specified threshold values according to an embodiment of the present invention.

FIG. 10 is a graph depicting a change into a see-through operation according to an acceleration value for a specified threshold values according to an embodiment of the present invention.

Referring to FIG. 10, when an acceleration sensor is used as a movement sensor, an acceleration value detected by the acceleration sensor of any one axis (e.g., X-axis) is measured as the amount of movement, and the acceleration value may be compared with a first threshold value or a second threshold value. The first threshold value is specified to correspond to a case in which a type of content being used by a wearer is video content. The second threshold value is specified to correspond to a case in which a type of content being used by a wearer is game content. FIG. 10 illustrates an example where the first electronic device provides a see-through operation while a value of acceleration in the positive direction or the negative direction according to the movement of the wearer is greater than the first threshold value. The positive direction and the negative direction may be directions opposite to each other with regard to any one axis.

Figure 11:
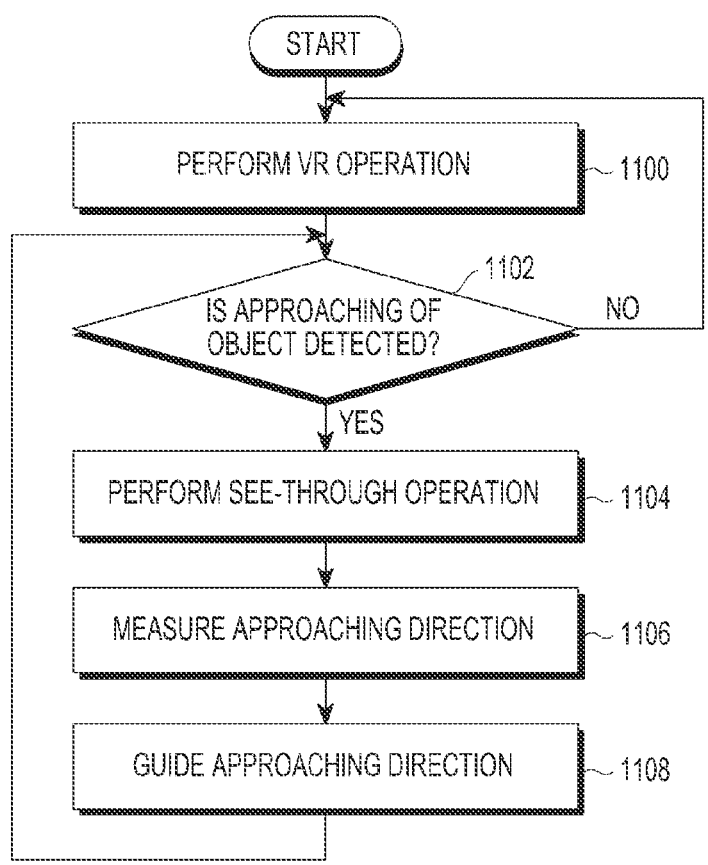
FIG. 11 is a flowchart illustrating another example of a method of controlling a display by a first electronic device according to an embodiment of the present invention.

FIG. 11 is a flowchart illustrating another example of a method of controlling a display by a first electronic device according to an embodiment of the present invention.

Referring to FIG. 11, at step 1100, the first electronic device mounted to the second electronic device performs a VR operation.

At step 1102, the first electronic device detects whether an object approaches a wearer wearing the second electronic device to which the first electronic device is mounted while performing the VR operation. If approaching the object is not detected at step 1102, the first electronic device proceeds to step 1100.

At step 1104, the first electronic device 300 changes the VR operation into a see-through operation when approaching the object is detected at step 1102.

At step 1106, the first electronic device measures a direction in which an object approaches.

At step 1108, the first electronic device guides the approaching direction. The approaching direction may be guided by displaying an image indicating a direction in which an object approaches. The guidance of the approaching direction may be implemented in any other forms. For example, the guidance may be implemented by voice. The process proceeds to step 1102 after step 1108. Therefore, when approaching of the object is not detected after the VR operation is changed into the see-through operation, the first electronic device 300 may provide the VR operation again at step 1100.

As described above, since the direction in which the object approaches may be measured by an approaching sensor, the object approaching the side or the rear of the wearer as well as the front view from the wearer may be detected, and an approaching direction may be measured and guided. Therefore, this scheme may further improve the limitation of a Field Of View (FOV) of the wearer, compared with a case in which the VR operation is changed into the see-through operation by detecting that an object approaches from the front simply through a camera (e.g., the rear camera 306).

A method of controlling a display of an electronic device according to an embodiment of the present invention may include changing the VR operation into the see-through operation, when it is detected that an object approaches a user while the VR operation is provided to the user, measuring a direction in which the object approaches, and guiding the direction in which the object approaches.

Changing the VR operation into the see-through operation includes photographing the front view from the user, and displaying a preview screen according to the photographing.

Guiding the direction in which the object approaches includes displaying an image indicating a direction in which the object approaches.

Figure 12:
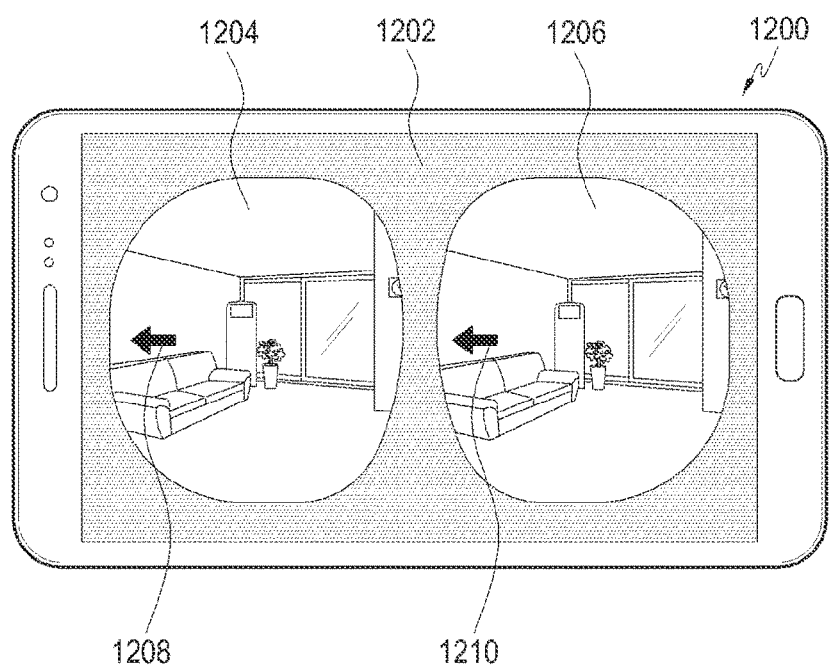
FIG. 12 illustrates an example of a screen which guides the direction in which an object approaches during a see-through operation according to an embodiment of the present invention.

FIG. 12 illustrates an example of a screen 1202, which guides a direction in which an object approaches during a see-through operation according to an embodiment of the present invention.

Referring to FIG. 12, an electronic device 1200 may be the electronic device 102 of FIG. 1, and may be the first electronic device 300 of FIGS. 3A and 3B. The electronic device 1200 displays images 1208 and 1210, which guide a direction in which an object approaches, on preview screens 1204 and 1206, respectively, of a camera photographing the front view from a wearer while displaying a see-through screen 1202. The images 1208 and 1210 may flicker to enable the wearer to easily recognize the images 1208 and 1210.

Figure 13:
FIG. 13 illustrates an example in which a plurality of wearers, each wearing a second electronic device to which a first electronic device is mounted and using content according to an embodiment of the present invention.

FIG. 13 illustrates an example in which a plurality of wearers, each wearing a second electronic device to which a first electronic device 300 is mounted and using content according to an embodiment of the present invention.

Referring to FIG. 13, when a plurality of wearers, who wear the second electronic device to which the first electronic device is mounted, use video content and/or game content, an electronic device, which each of the wearers wears, may change the VR operation into a see-through operation by detecting movement of a wearer thereof or approaching of other wearers. Therefore, the wearers can use content safely. Further, the electronic device worn by each of the wearers can notify the movement of the wearer thereof by transmitting the movement of the wearer thereof to an electronic device worn by another wearer, for example, through an Access Point (AP).

Figure 14:
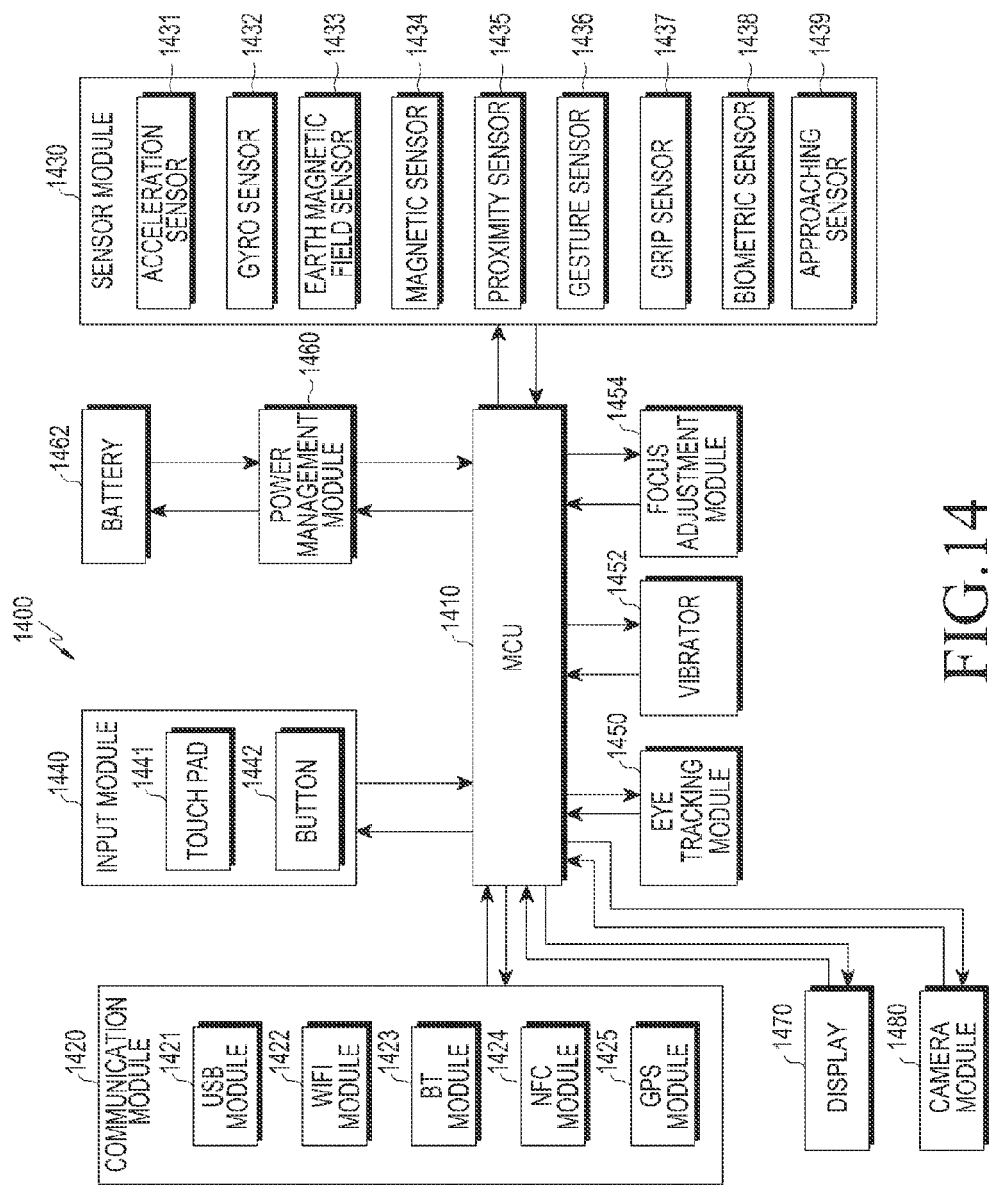
FIG. 14 is a block diagram illustrating a configuration of a second electronic device according to another embodiment of the present invention.

FIG. 14 is a block diagram illustrating a configuration of a second electronic device 1400 according to another embodiment of the present invention.

Referring to FIG. 14, the second electronic device 1400, instead of the first electronic device, may provide, to a wearer, a VR operation and a see-through operation same as or similar to the first electronic device. The second electronic device 1400 may include an MCU 1410, a communication module 1420, a sensor module 1430, an input module 1440, an eye tracking module 1450, a vibrator 1452, a focus adjustment module 1454, a power management module 1460, a battery 1462, a display 1470, and a camera 1480.

The MCU 1410, the communication module 1420, the sensor module 1430, the input module 1440, the eye tracking module 1450, the vibrator 1452, the focus adjustment module 1454, the power management module 1460, and the battery 1462 may be configured the same as or similarly to the MCU 410, the communication module 420, the sensor module 430, the input module 440, the eye tracking module 450, the vibrator 452, the focus adjustment module 454, the power management module 460, and the battery 462 of the second electronic device 400 in FIG. 4, respectively.

The communication module 1420 may include, for example, a USB module 1421, a WiFi module 1422, a BT module 1423, a NFC module 1424 and a GPS module 1425. The USB module 1421, the WiFi module 1422, the BT module 1423, the NFC module 1424, and the GPS module 1425 may be configured the same as or similarly to the USB module 421, the WiFi module 422, the BT module 423, the NFC module 424, and the GPS module 425 in FIG. 4, respectively.

The sensor module 1430 may include, for example, at least one of an acceleration sensor 1431, a gyro sensor 1432, an Earth magnetic field sensor 1433, a magnetic sensor 1434, a proximity sensor 1435, a gesture sensor 1436, a grip sensor 1437, a biometric sensor 1438, and an approaching sensor 1439. The acceleration sensor 1431, the gyro sensor 1432, the Earth magnetic field sensor 1433, the magnetic sensor 1434, the proximity sensor 1434, the gesture sensor 1436, the grip sensor 1437, the biometric sensor 1438, and the approaching sensor 1439 may be configured the same as or similarly to the acceleration sensor 431, the gyro sensor 432, the Earth magnetic field sensor 433, the magnetic sensor 434, the proximity sensor 435, the gesture sensor 436, the grip sensor 437, the biometric sensor 438, and the approaching sensor 439 in FIG. 4, respectively.

The input module 1440 may include a touch pad 1441 and a button 1442. The touch pad 1441 and the button 1442 may be configured the same as or similarly to the touch pad 441 and the button 442 in FIG. 4, respectively.

Therefore, in the description of FIG. 14, the description duplicated with the description of FIG. 4 will be omitted.

The second electronic device 1400 further includes a display 1470 installed in a body instead of a structure in which the first electronic device 300 is detachable. The display 1470 is installed in the body to provide a screen to a user through the lenses instead of the display of the first electronic device. The display 1470 displays a screen according to the VR operation or the see-through operation according to another embodiment of the present invention. The camera 1480 is installed in front of the body to photograph the front view from a wearer.

Referring to FIG. 14, the second electronic device 1400 provides to the wearer, a VR operation and a see-through operation to the same as or similar to the first electronic device.

In accordance with another embodiment of the present invention, the MCU 1410 measures the amount of movement when the movement of the wearer is detected while providing the VR operation through the display 1470, and changes the VR operation into the see-through operation when the amount of the movement is greater than a threshold value corresponding to a type of content being used by the wearer. In accordance with another embodiment of the present invention, when it is detected that an object approaches the wearer while the VR operation is provided through the display 1470, the MCU 1410 changes the VR operation into the see-through operation, and measures and guides a direction in which the object approaches. When changing the VR operation into the see-through operation, the MCU 1410 photographs the front view from the wearer through the camera 1480, and displays a preview screen according to the photographing through the display 1470. The MCU 1410 guides the direction in which the object approaches, by displaying, on the display 1470, an image indicating the direction in which the object approaches.

The description that the second electronic device 1400 changes the VR operation into the see-through operation or changes see-through operation into the VR operation again after the change into the see-through operation may be the same as or similar to the description referring to the first electronic device. Therefore, the detailed description relating thereto will be omitted.

A head mounted electronic device according to another embodiment of the present invention may include a movement sensor configured to detect movement of a user wearing the head mounted electronic device, a display configured to display a screen according to one of the VR operation and a see-through operation, and a controller configured to, when the movement of the user is detected while the VR operation is provided through the display, measure an amount of the movement, and when the amount of the movement is larger than a threshold value corresponding to a type of content being used by the user, change the VR operation into the see-through operation.

A threshold value corresponding to game content may be specified greater than a threshold value corresponding to video content.

The head mounted electronic device may further include a camera, and the controller, when changing the VR operation into the see-through operation, may photograph the front view from the user through the camera and display a preview screen according to the photographing through the display.

A head mounted electronic device according to another embodiment of the present invention may include an approaching sensor configured to detect whether an object approaches a user wearing the head mounted electronic device, a display configured to display a screen according to one of the VR operation and the see-through operation, and a controller configured to, when it is detected that the object approaches the user while the VR operation is provided through the display, change the VR operation into the see-through operation, and measure and guide a direction in which the object approaches.

The approaching sensor may be at least one of a space recognition sensor or a wireless communication module.

The electronic device further include a camera, and the controller, when changing the VR operation into the see-through operation, may photograph the front view from the user through the camera and display a preview screen according to the photographing through the display.

The controller may guide the direction in which the object approaches by displaying an image indicating the direction in which the object approaches through the display.

Figure 15:
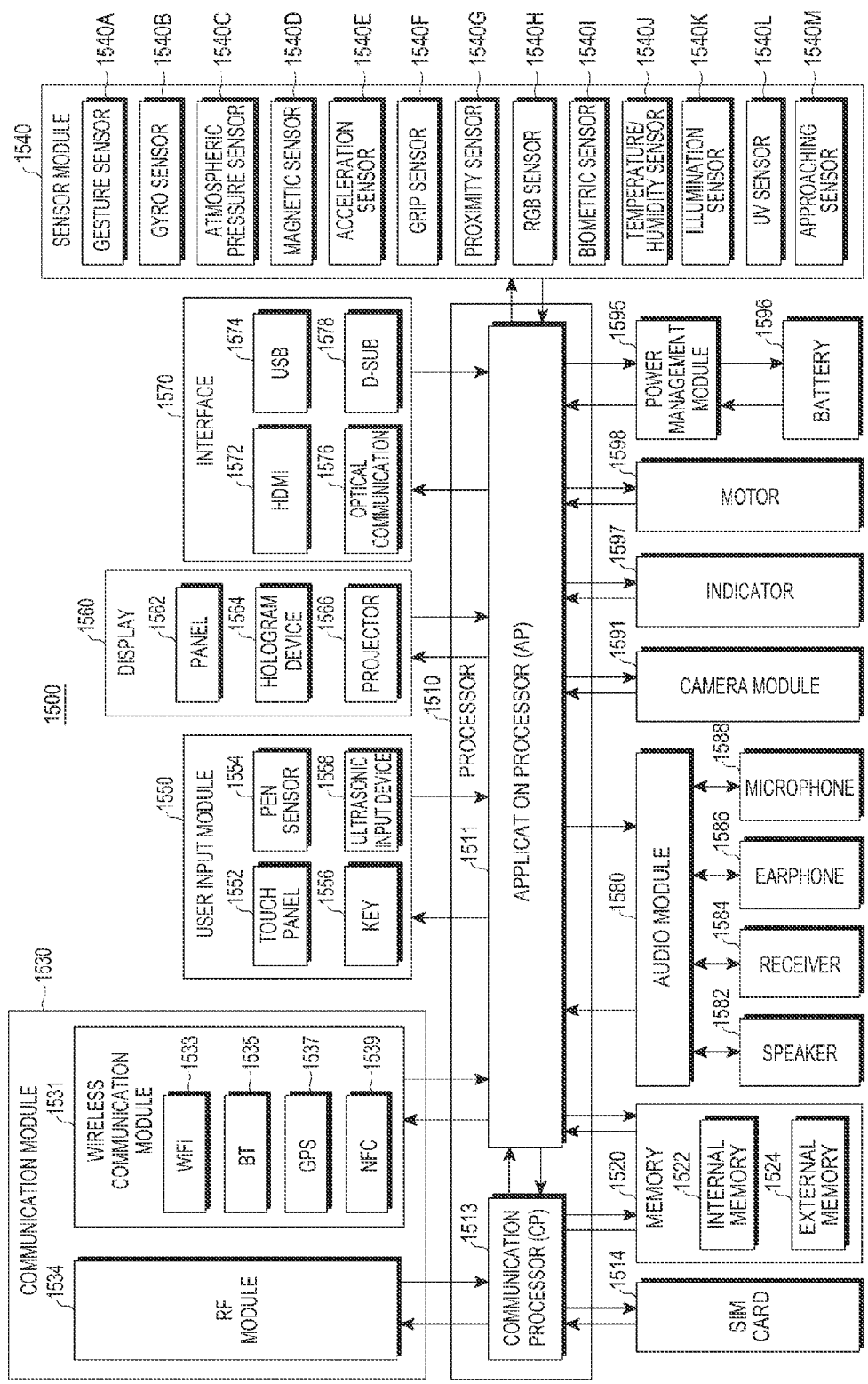
FIG. 15 is a block diagram illustrating a detailed structure of an electronic device according to an embodiment of the present invention.

FIG. 15 is a block diagram illustrating a detailed structure of an electronic device according to an embodiment of the present invention.

An electronic device 1500 in FIG. 15 may configure, for example, as a part or the entirety of the electronic device 102 in FIG. 1.

Referring to FIG. 15, the electronic device 1500 may include at least one processor 1510, a Subscriber Identification Module (SIM) card 1514, a memory 1520, a communication module 1530, a sensor module 1540, an input module 1550, a display 1560, an interface 1570, an audio module 1580, a camera module 1591, a power management module 1595, a battery 1596, an indicator 1597, or a motor 1598.

The processor 1510 may include one or more Application Processors (APs) 1511 or one or more Communication Processors (CPs) 1513. The processor 1510 may be, for example, the processor 120 illustrated in FIG. 1. Although it is illustrated in FIG. 15 that the AP 1511 and the CP 1513 are included in the processor 1510, the AP 1511 and the CP 1513 may be included in different IC packages. Further, in accordance with an embodiment of the present invention, the AP 1511 and the CP 1513 may be included in one IC package.

The AP 1511 drives an operating system or an application program so as to control a plurality of hardware or software elements connected to the AP 1511, and executes data processing and operations associated with various data including multimedia data. The AP 1511 may be implemented as, for example, a System on Chip (SoC). In accordance with an embodiment of the present invention, the processor 1510 may further include a Graphic Processing Unit (GPU).

The CP 1513 manages a data link in communication between the electronic device 1500 and other electronic devices connected over a network, and converts a communication protocol. The CP 1513 may be implemented as, for example, an SoC. In accordance with an embodiment of the present invention, the CP 1513 executes at least a part of a multimedia controlling function. The CP 1513 identifies and authenticates the electronic device 1500 in a communication network using a SIM card 1514. Further, the CP 1513 provides a user with services such as voice calls, video calls, text messages, packet data, or the like.

The CP 1513 controls data transmission and reception of the communication module 1530. Although the elements such as the CP 1513, the power management module 1595, and the memory 1520 are illustrated in FIG. 15 as separate elements, in accordance with an embodiment of the present invention, the AP 1511 may be implemented to include at least a few of the described elements (e.g., the CP 1511).

In accordance with an embodiment of the present invention, the AP 1511 or the CP 1513 loads, in a volatile memory, a command or data received from at least one of non-volatile memory and other elements connected to each entity, and processes the same. Further, the AP 1511 or the CP 1513 stores, in a non-volatile memory, data that is received from or generated by at least one of other elements.

The SIM card 1514 is a card implementing a subscriber identity module, and may be inserted into a slot formed in a specific location of the electronic device 1500. The SIM card 1514 may include a unique identification information (e.g., Integrated Circuit Card Identifier (ICCID)) or subscriber information (e.g., International Mobile Subscriber Identity (IMSI)).

The memory 1520 may include an internal memory 1522 and an external memory 1524. The memory 1520 may be, for example, the memory 130 illustrated in FIG. 1. The internal memory 1522 may include, for example, at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like). In accordance with an embodiment of the present invention, the internal memory 1522 may be a Solid State Drive (SSD). The external memory 1524 may include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1524 may be functionally connected to the electronic device 1500 through various interfaces.

Although not illustrated, the electronic device 1500 may further include a storage device (or a storage medium) such as a hard drive device.

The communication module 1530 may include a wireless communication module 1531 or a Radio Frequency (RF) module 1534. The communication module 1530 may be included in, for example, the communication interface 160 illustrated in FIG. 1. The wireless communication module 1531 may include, for example, WiFi 1533, BT 1535, a GPS 1537, or a NFC 1539. For example, the wireless communication module 1531 may provide a wireless communication function using a RF. Alternatively, the wireless communication module 1531 may include a network interface (e.g., a LAN card), a modem, or the like for connecting the electronic device 1500 to a network (e.g., Internet, a Local Area Network (LAN), a Wireless Area Network (WAN), a communication network, a cellular network, a satellite network, or a Plain Old Telephone Service (POTS), and the like).

The RF module 1534 processes transmission and reception of a voice or data signal. The RF module 1534 may include, for example, a transceiver, a Power Amp Module (PAM), a frequency filter, a Low Noise Amplifier (LNA), or the like. Further, the RF module 1534 may further include a component for transmitting and receiving an electromagnetic wave in a free space in wireless communication, for example, a conductive substance, a conductive wire, or the like.

The sensor module 1540 may include at least one of, for example, a gesture sensor 1540A, a gyro sensor 1540B, an atmospheric pressure sensor 1540C, a magnetic sensor 1540D, an acceleration sensor 1540E, a grip sensor 1540F, a proximity sensor 1540G, a Red, Green, and Blue (RGB) sensor 1540H, a biometric sensor 1540I, a temperature/humidity sensor 1540J, an illuminance sensor 1540K, an Ultra Violet (UV) sensor 1540L, an approaching sensor 1540M, and an Infrared (IR) sensor. The sensor module 1540 measures a physical quantity or senses an operation state of an electronic device, so as to convert the measured or sensed information into an electric signal. Alternatively, the sensor module 1540 may include, for example, an E-nose sensor, an Electromyography (EMG) sensor, an Electroencephalogram (EEG) sensor, an Electrocardiogram (ECG) sensor, a fingerprint sensor, or the like. The sensor module 1540 may further include a control circuit for controlling one or more sensors included therein.

The input module 1550 may include a touch panel 1552, a (digital) pen sensor 1554, a key 1556, or an ultrasonic input device 1558. The input module 1550 may be included in, for example, the input/output interface 140 illustrated in FIG. 1. The touch panel 1552 recognizes a touch input based on, for example, at least one of a capacitive scheme, a resistive scheme, an infrared scheme, and an acoustic wave scheme. Further, the touch panel 1552 may further include a controller. A capacitive-type touch panel may detect not only physical contact but also proximity. The touch panel 1552 may further include a tactile layer function. In this case, the touch panel 1552 may provide a user with a tactile reaction.

The (digital) pen sensor 1554 may be embodied, for example, using a method equal or similar to a method of receiving a touch input of a user, or using a separate recognition sheet. The key 1556 may include, for example, a physical button. Further, the key 1556 may include, for example, an optical key, a key pad, or a touch key. The ultrasonic input device 1558 uses an input tool that generates an ultrasonic signal and enables the electronic device 1500 to determine data by detecting the ultrasonic signal to a microphone 1588, thereby enabling wireless recognition. In accordance with an embodiment of the present invention, the electronic device 1500 uses the communication module 1530 to receive a user input from an external electronic device connected thereto (e.g., a network, a computer, or a server).

The display 1560 may include a panel 1562, a hologram device 1564, or a projector 1566. The display 1560 may be, for example, the display 150 illustrated in FIG. 1. The panel 1562 may be, for example, a Liquid Crystal Display (LCD), an Active Matrix Organic Light Emitting Diode (AM-OLED), or the like. The panel 1562 may be implemented to be, for example, flexible, transparent, or wearable. The panel 1562 may be formed to be a single module with the touch panel 1552. The hologram device 1564 shows a three-dimensional image in the air using interference of light. The projector 1566 shows an image on an external screen using projection of light. In accordance with an embodiment of the present invention, the display 1560 may further include a control circuit for controlling the panel 1562, the hologram device 1564, or the projector 1566.

The interface 1570 may include, for example, a High-Definition Multimedia Interface (HDMI) 1572, a Universal Serial Bus (USB) 1574, Optical communication 1576, or D-subminiature (D-sub) 1578. The interface 1570 may be included in, for example, the communication interface 160 illustrated in FIG. 1. Alternatively, the interface 1570 may include, for example, a Mobile High-definition Link (MHL), a Secure Digital/Multi Media Card (SD/MMC), or an Infrared Data Association (IrDA).

The audio module 1580 bilaterally converts a sound and an electronic signal. The audio module 1580 may be included in, for example, the input/output interface 140 illustrated in FIG. 1. The audio module 1580 processes sound information which is input or output through, for example, a speaker 1582, a receiver 1584, an earphone 1586, the microphone 1588, or the like.

The camera module 1591 is a device capable of photographing an image or a video, and in accordance with an embodiment of the present invention, may include one or more image sensors (e.g., a front side sensor or a rear side sensor), a lens, an Image Signal Processor (ISP), or a flash (e.g., a Light Emitting Diode (LED) or xenon lamp).

The power management module 1595 manages power of the electronic device 1500. Although not illustrated, the power management module 1595 may include, for example, a Power Management Integrated Circuit (PMIC), a charger Integrated Circuit (IC), or a battery gauge.

The PMIC may be mounted to, for example, an integrated circuit or a SoC semiconductor. Charging methods may be classified into a wired charging method and a wireless charging method. The charger IC charges a battery and prevents introduction of over-voltage or over-current from a charger. In accordance with an embodiment of the present invention, the charger IC may include a charger IC for at least one of the wired charging method and the wireless charging method. A magnetic resonance scheme, a magnetic induction scheme, or an electromagnetic scheme may be examples of the wireless charging method, and an additional circuit for wireless charging, such as a coil loop circuit, a resonance circuit, a rectifier circuit, and the like may be added.

The battery gauge measures, for example, a residual quantity of the battery 1596, a voltage, a current, or a temperature during the charging. The battery 1596 stores electricity and supply power. The battery 1596 may include, for example, a rechargeable battery or a solar battery.

The indicator 1597 displays a specified state of the electronic device 1500 or a part of the electronic device 1500 (e.g., the AP 1511), for example, a boot-up state, a message state, a charging state, or the like. The motor 1598 converts an electrical signal to a mechanical vibration.

Although not illustrated, the electronic device 1500 may include a processing device (for example, a GPU) for supporting a mobile TV. The processing device for supporting the mobile TC may process, for example, media data associated with the standard of Digital Multimedia Broadcasting (DMB), Digital Video Broadcasting (DVB), a media flow, or the like.

The above described elements of the electronic device according to various embodiments of the present invention may be formed of one or more components, and a name of a corresponding element may be changed based on the type of electronic device. The electronic device according to the present invention may include one or more of the aforementioned elements or may further include other additional elements, or some of the aforementioned elements may be omitted. Further, some of the elements of the electronic device according to the various embodiments of the present invention may be combined to form a single entity, and thus, may equivalently execute functions of the corresponding elements prior to the combination.

According to various embodiments of the present invention, at least part of a device (for example, modules or functions thereof) or a method (for example, operations) according to the various embodiments of the present invention may be embodied by, for example, an instruction stored in a computer readable storage medium provided in a form of a programming module. When the instruction is executed by at least one processor (e.g., the processor 120 or a processor that may be included in each of the MCUs 410, 1410), the at least one processor may execute a function corresponding to the instruction. The non-transitory computer-readable storage medium may be, for example, the memory 130 or a memory that may be included in each of the MCUs 410 and 1410. At least some of the programming modules may be implemented (e.g., executed) by, for example, the processor. At least some of the programming modules may include, for example, a module, a program, a routine, a set of instructions, or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instructions may include high class language codes, which may be executed in a computer by using an interpreter, as well as machine codes made by a compiler. The aforementioned hardware device may be configured to operate as one or more software modules in order to perform the operation of various embodiments of the present invention, and vice versa.

The electronic device according to various embodiments of the present invention may receive a program including commands for performing a method of controlling a display by an electronic device, from a program providing device wired or wirelessly connected thereto, and various electronic devices or servers may be the program providing device. The program providing device may include a memory for storing the program, a communication module for performing wired or wireless communication with an electronic device, and a processor for making a request from the electronic device or transmitting the corresponding program to the electronic device.

A module or a programming module according to the present invention may include at least one of the described elements, a few of the elements may be omitted, or additional elements may be included. Operations executed by a module, a programming module, or other elements according to various embodiments of the present invention may be executed sequentially, in parallel, repeatedly, or in a heuristic manner. Further, some operations may be executed according to another order or may be omitted, or other operations may be added.

Embodiments of the present invention disclosed in the present specification and the accompanying drawings are just predetermined examples for easily describing the technical contents of the present invention and helping understanding of the present invention, but the present invention is not limited thereto. Therefore, in addition to the embodiments described herein, the scope of the various embodiments of the present invention should be construed to include all modifications or modified forms drawn based on the technical idea of the various embodiments of the present invention. It will be understood by those skilled in the art that various changes in form and details may be made therein without departing from the spirit and scope of the present invention as defined by the appended claims and any equivalents thereof.

What is claimed is:

1. A method of controlling a display of an electronic device, the method comprising:
    displaying a Virtual Reality (VR) operation screen on a see-closed display of the electronic device;
    measuring an amount of movement of a user wearing a head mounted electronic device, to which the electronic device is detachably mounted, when the movement of the user is detected while the VR operation screen is displayed on the see-closed display;
    comparing the amount of the movement with a threshold value corresponding to a type of content being used in the VR operation among a plurality of threshold values that correspond to a plurality of type of content;
    photographing a front view from the user by using a camera located in an opposite direction to a screen of the see-closed display, when the amount of the movement is greater than the threshold value;
    displaying a preview screen according to the photographing on at least a portion of the screen of the see-closed display; and
    when a position of the user changes by an amount greater than a specified value, the electronic device determines that a current situation is an emergency situation and automatically changes a current operation into a see-through operation.

2. The method of claim 1, wherein the threshold value corresponding to game content is specified greater than the threshold value corresponding to video content.

3. A method of controlling a display of an electronic device, the method comprising:
- displaying a Virtual Reality (VR) operation screen on a see-closed display of the electronic device;
- photographing a front view from a user wearing a head mounted electronic device, to which the electronic device is detachably mounted, by using a camera located in an opposite direction to a screen of the see-closed display, when it is detected that an object external to the head mounted electronic device approaches the user, while the VR operation screen is displayed on the see-closed display;
- displaying a preview screen according to the photographing on at least a portion of the screen of the see-closed display;
- measuring a direction in which the object approaches;
- guiding the direction in which the object approaches the user; and
- when a position of the user changes by an amount greater than a specified value, a current situation is determined to be an emergency situation and a current operation is changed into a see-through operation.

4. The method of claim 3, wherein guiding the direction in which the object approaches comprises displaying an image indicating the direction in which the object approaches on the see-closed display.

5. An electronic device comprising:
- a see-closed display;
- a camera located in an opposite direction to a screen of the see-closed display; and
- a controller configured to:
  - display a Virtual Reality (VR) operation screen on the see-closed display;
  - measure an amount of movement of a user wearing a head mounted electronic device, to which the electronic device is detachably mounted, when the movement of the user is detected while the VR operation screen is displayed on the see-closed display;
  - compare the amount of the movement with a threshold value corresponding to a type of content being used in the VR operation among a plurality of threshold values that correspond to a plurality of type of content;
  - photograph a front view from the user by using the camera, when the amount of the movement is greater than the threshold value; and
  - display a preview screen according to the photographing on at least portion of the screen of the see-closed display,
- wherein when a position of the user changes by an amount greater than a specified value, the electronic device determines that a current situation is an emergency situation and automatically changes a current operation into a see-through operation.

6. An electronic device comprising:
- a see-closed display;
- a camera located in an opposite direction to a screen of the see-closed display; and
- a controller configured to:
  - display a Virtual Reality (VR) operation screen on the see-closed display;
  - photograph a front view from a user wearing a head mounted electronic device, to which the electronic device is detachably mounted, by using the camera, when it is detected that an object external to the head mounted electronic device approaches the user, while the VR operation screen is displayed on the see-closed display;
  - display a preview screen according to the photographing on at least portion of the screen of the see-closed display;
  - measure a direction in which the object approaches;
  - guide the direction in which the object approaches the user; and
  - when a position of the user changes by an amount greater than a specified value, determine that a current situation is an emergency situation and automatically change a current operation into a see-through operation.

7. The electronic device of claim 6, wherein the controller is further configured to guide the direction in which the object approaches by displaying an image indicating the direction in which the object approaches on the see-closed display.

8. A head mounted electronic device comprising:
- a movement sensor;
- a see-closed display;
- a camera located in an opposite direction to a screen of the see-closed display; and
- a controller configured to:
  - display a Virtual Reality (VR) operation screen on the see-closed display;
  - measure an amount of movement of a user wearing the head mounted electronic device, when the movement of the user is detected through the movement sensor while the VR operation screen is displayed on the see-closed display;
  - compare the amount of the movement with a threshold value corresponding to a type of content being used in the VR operation among a plurality of threshold values that correspond to a plurality of type of content;
  - photograph a front view from the user by using the camera, when the amount of the movement is greater than the threshold value; and
  - display a preview screen according to the photographing on at least portion of the screen of the see-closed display,
- wherein when a position of the user changes by an amount greater than a specified value, a current situation is determined to be an emergency situation and a current operation is changed into a see-through operation.

9. The head mounted electronic device of claim 8, wherein the threshold value corresponding to game content is specified greater than the threshold value corresponding to video content.

10. A head mounted electronic device comprising:
- an approaching sensor;
- a see-closed display;
- a camera located in an opposite direction to a screen of the see-closed display; and
- a controller configured to:
  - display a Virtual Reality (VR) operation screen on the see-closed display;
  - photograph a front view from a user wearing the head mounted electronic device by using the camera, when it is detected that an object external to the head mounted electronic device approaches the user through the approaching sensor, while the VR operation screen is displayed on the see-closed display;

display a preview screen according to the photographing on at least portion of the screen of the see-closed display;

measure a direction in which the object approaches;

guide the direction in which the object approaches the user; and when a position of the user changes by an amount greater than a specified value, a current situation is determined to be an emergency situation and a current operation is changed into a see-through operation.

11. The head mounted electronic device of claim 10, wherein the approaching sensor is at least one of a space recognition sensor and a wireless communication module.

12. The head mounted electronic device of 10, wherein the controller is further configured to display an image indicating the direction in which the object approaches on the see-closed display.

\* \* \* \* \*